(12) United States Patent
Suzuki et al.

(10) Patent No.: US 9,233,497 B2
(45) Date of Patent: Jan. 12, 2016

(54) GATE VALVE AND MANUFACTURING METHOD OF GATE VALVE

(71) Applicant: TORAY INDUSTRIES, INC., Tokyo (JP)

(72) Inventors: Tamotsu Suzuki, Otsu (JP); Yoshihiro Kawahara, Otsu (JP); Yasumoto Noguchi, Otsu (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 14/387,483

(22) PCT Filed: Feb. 25, 2013

(86) PCT No.: PCT/JP2013/001039
§ 371 (c)(1),
(2) Date: Sep. 23, 2014

(87) PCT Pub. No.: WO2013/145539
PCT Pub. Date: Oct. 3, 2013

(65) Prior Publication Data
US 2015/0091212 A1 Apr. 2, 2015

(30) Foreign Application Priority Data
Mar. 26, 2012 (JP) ................................. 2012-068938

(51) Int. Cl.
| | |
|---|---|
| B29C 45/28 | (2006.01) |
| F16K 3/26 | (2006.01) |
| F16K 11/07 | (2006.01) |
| B29C 70/48 | (2006.01) |
| B29K 101/10 | (2006.01) |

(52) U.S. Cl.
CPC ............ *B29C 45/2806* (2013.01); *B29C 45/28* (2013.01); *F16K 3/265* (2013.01); *F16K 11/0716* (2013.01); *B29C 70/48* (2013.01); *B29C 2045/2893* (2013.01); *B29K 2101/10* (2013.01); *Y10T 137/86549* (2015.04)

(58) Field of Classification Search
CPC ..................... B29C 2045/2879; B29C 45/24
USPC ......................... 264/39, 328.2, 328.6
See application file for complete search history.

(56) References Cited

U.S. PATENT DOCUMENTS

| | | |
|---|---|---|
| 5,187,001 A | 2/1993 | Brew |
| 2008/0057150 A1* | 3/2008 | Harper ................... B29C 70/48 425/562 |

FOREIGN PATENT DOCUMENTS

| | | |
|---|---|---|
| GB | 2401924 | 11/2004 |
| JP | 4998461 | 8/1974 |

(Continued)

OTHER PUBLICATIONS

International Search Report for International Application No. PCT/JP2013/001039 mailed May 28, 2013.

(Continued)

*Primary Examiner* — Jill Heitbrink
(74) *Attorney, Agent, or Firm* — RatnerPrestia

(57) ABSTRACT

A gate valve is configured to have a first fluid flow path. In a state where a gate valve pin is at a first pin position, a front end section on an injection hole side of the gate valve pin closes an injection hole. In a state where the gate valve pin is at a second pin position that is more distant from the injection hole than the first pin position, a front end section opens the injection hole to make communication between the first fluid flow path and the injection hole and thereby form a resin supply line. In a state where a sleeve is at a first sleeve position and the gate valve pin is at the first pin position, a second fluid flow path is formed in the gate valve to connect an injection hole-side end of the first fluid flow path to outside of the gate valve and is made to communicate with the first fluid flow path and thereby form a cleaning line.

10 Claims, 13 Drawing Sheets

(56) References Cited

FOREIGN PATENT DOCUMENTS

| JP | 11247756 | 9/1999 |
|----|----------|--------|
| JP | 2003245949 | 9/2003 |
| JP | 3806785 | 8/2006 |
| JP | 4203903 | 1/2009 |

OTHER PUBLICATIONS

International Preliminary Report on Patentability and Written Opinion of the International Searching Authority for International Application No. PCT/JP2013/001039.

* cited by examiner

GATE VALVE PIN : OPEN (SECOND PIN POSITION)
SLEEVE : CLOSED (SECOND SLEEVE POSITION)

<DURING INJECTION OF RESIN>

GATE VALVE PIN : OPEN (SECOND PIN POSITION)

SLEEVE : CLOSED (SECOND SLEEVE POSITION)

<COMPLETION OF RESIN INJECTION>

GATE VALVE PIN : CLOSED (FIRST PIN POSITION)
SLEEVE : CLOSED (SECOND SLEEVE POSITION)

<DURING INJECTION OF RESIN>

GATE VALVE PIN : OPEN (SECOND PIN POSITION)
SLEEVE : CLOSED (SECOND SLEEVE POSITION)

<COMPLETION OF RESIN INJECTION>

GATE VALVE PIN : CLOSED (FIRST PIN POSITION)

SLEEVE : CLOSED (SECOND SLEEVE POSITION)

GATE VALVE PIN : CLOSED (FIRST PIN POSITION)
SLEEVE : OPEN (FIRST SLEEVE POSITION)

GATE VALVE AND MANUFACTURING METHOD OF GATE VALVE

CROSS REFERENCE TO RELATED APPLICATIONS

This is the U.S. National Phase application of PCT/JP2013/001039, filed Feb. 25, 2013, which claims priority to Japanese Patent Application No. 2012-068938, filed Mar. 26, 2012, the disclosures of each of these applications being incorporated herein by reference in their entireties for all purposes.

FIELD OF THE INVENTION

The present invention relates to a gate valve switched over to allow or block a flow of thermosetting resin.

BACKGROUND OF THE INVENTION

An exemplary method of molding a thermosetting resin (hereinafter may be simply referred to as resin) injects the resin into a mold and heats the mold. A known resin injection device used for this molding method is a gate valve configured to open and close a resin injection hole by moving a gate valve pin. This gate valve is cleaned at regular intervals, in order to avoid potential troubles caused by an increase in viscosity of the resin or curing of the resin retained inside of the gate valve.

For example, Patent Document 1 specified below describes a gate valve that can be cleaned. This gate valve includes a gate valve pin configured to open and close a resin injection hole and a discharge flow path for a cleaning liquid formed by a space between a casing and the gate valve pin of the gate valve. A resin supply flow path is formed inside of the gate valve pin. The supply flow path is made to communicate with outside of the gate valve pin via an opening formed in the vicinity of a front end section on the injection hole side of the gate valve pin. The gate valve pin partly has a first convex protruded from a side surface thereof to have a larger outer diameter. The casing has a second convex protruded from an inner surface of receiving the gate valve pin toward the gate valve pin to narrow the diameter of the discharge flow path above the first convex. The gate valve of this configuration operates as described below.

Moving the gate valve pin upward opens the injection hole. In this state, the first convex comes into contact with the second convex to block the discharge flow path in the middle thereof. In this state, when the resin is supplied through the supply flow path, the resin is flowed through the supply flow path inside of the gate valve pin into the injection hole via the opening. When the gate valve pin is moved downward, the injection hole is closed by an end of the gate valve pin. The first convex is accordingly not in contact with the second convex, so that the blocked discharge flow path is opened. The discharge flow path is made to communicate with the supply flow path via the opening of the gate valve pin. In this state, when the cleaning liquid is supplied through the supply flow path, the cleaning liquid cleans the flow passage of the resin and is discharged through the discharge flow path. As clearly understood from the above description, in the gate valve of Patent Document 1, when one of the injection hole and the discharge flow path is opened, the other is always closed.

PATENT DOCUMENTS

Patent Document 1: UK Patent GB2401924

SUMMARY OF THE INVENTION

The above gate valve, however, still has a room for improvement. For example, the resin is retained in the upstream of the second convex in the discharge flow path in the state that the injection hole is closed. The retained resin may be cured with heat for heating the mold and may cause a trouble, for example, incapable of moving the gate valve pin. In another example, while the gate valve pin is moved downward to close the injection hole, the resin retained in the non-cured state may be pushed out by the gate valve pin to be moved to the discharge flow path and may be leaked to the pathway outside of the gate valve. Curing the leaked resin may block the discharge flow path.

In order to avoid such events, the gate valve may be cleaned after each time of injection of the resin. This, however, needs a greater amount of cleaning liquid, compared with the case that cleaning is performed after a plurality of times of injection of the resin. Additionally, the retained resin is discharged to the discharge flow path. This increases the amount of waste of the resin.

In order to suppress the air from being contained in a molded product of the resin, the air present inside of the mold is generally sucked prior to injection of the resin. In the above gate valve, however, there is a time period when both the injection hole and the discharge flow path are opened simultaneously in the course of moving the gate valve pin. Even when the air present inside of the mold is sucked prior to injection of the resin, the air flows from the discharge flow path to inside of the mold at the moment of opening the injection hole. This fails to sufficiently suppress the air from being contained in the molded product.

With regard to any gate valve used for molding a resin as well as the gate valve described above, from the standpoint of the efficiency of the manufacturing process of the molded product of the resin, there is also a need to reduce the frequency of cleaning. From the same standpoint, it is also demanded to clean the gate valve by using the time required for curing the resin injected in the mold.

The present invention is made to solve at least part of the problems described above and may be implemented by the following aspects or embodiments.

[Aspect 1]

There is provided a gate valve configured to have an injection hole formed therein and switched over to allow or block a flow of a thermosetting resin via the injection hole. The gate valve comprises: a casing configured to have a specific space formed inside thereof to be extended along a specified direction; a gate valve pin configured to be movable in the specified direction in the specific space; and a sleeve provided outside of the gate valve pin in the specific space and configured to be movable in the specified direction. The gate valve is configured to have a first fluid flow path. In a state where the gate valve pin is at a first pin position, a front end section on an injection hole side of the gate valve pin closes the injection hole to block communication between the first fluid flow path and the injection hole. In a state where the gate valve pin is at a second pin position that is more distant from the injection hole than the first pin position, the front end section opens the injection hole to make communication between the first fluid flow path and the injection hole and thereby form a resin supply line for allowing the flow of the thermosetting resin. In a state where the sleeve is at a first sleeve position and the gate valve pin is at the first pin position, a second fluid flow path is formed in the gate valve to connect an injection hole-side end of the first fluid flow path to outside of the gate valve and is made to communicate with the first fluid flow path and thereby form a cleaning line for supplying and discharging a cleaning liquid. In a state where the sleeve is at a second sleeve position that is closer to the injection hole than the first sleeve position, the sleeve blocks communication between the first fluid flow path and the second fluid flow path connecting to the outside.

According to the above configuration of the gate valve, moving the gate valve pin to the second pin position from the state that the gate valve pin is at the first pin position and the sleeve is at the second sleeve position allows the flow of the thermosetting resin through the resin supply line. Subsequently moving the gate valve pin to the first pin position blocks the flow of the thermosetting resin through the resin supply line. Subsequently moving the sleeve to the first sleeve position forms the cleaning line to clean the gate valve, while blocking the resin supply line. In this manner, the gate valve can be cleaned by using the time required for curing the thermosetting resin supplied from the gate valve. According to the configuration of the gate valve, after completion of cleaning the gate valve through the cleaning line, moving the sleeve to the second sleeve position blocks the cleaning line. Subsequently moving the gate valve pin to the second pin position again allows the flow of the thermosetting resin through the resin supply line. In this manner, control is made to prevent the resin supply line and the cleaning line from being formed simultaneously. As a result, this suppresses the air from entering from the cleaning line to the resin supply line. This also prevents the thermosetting resin retained in the resin supply line from leaking to the cleaning line in the course of blocking the resin supply line.

[Aspect 2]

In the gate valve according to Aspect 1, the first fluid flow path may be formed inside of the gate valve pin as a passage to communicate a first hole formed at an end of the first fluid flow path opposite to the injection hole-side end with a second hole formed at the injection hole-side end. The second fluid flow path may be formed as a passage to connect the second hole to the outside of the gate valve.

According to the above configuration of the gate valve, the first fluid flow path is formed inside of the gate valve pin. This simplifies the device configuration. Compared with other configurations, this configuration allows for reduction of the outer diameter of the gate valve. As a result, this enables the middle area and the outer area of the gate valve to be equally cooled.

[Aspect 3]

In the gate valve according to Aspect 2, a second hole-side end of the second fluid flow path may be blocked in a state where the sleeve is at the second sleeve position.

According to the above configuration of the gate valve, allowing the flow of the thermosetting resin through the injection hole in the state where the sleeve is at the second sleeve position suppresses the thermosetting resin from being retained in the second fluid flow path by subsequently blocking the resin supply line. This suppresses the thermosetting resin from being retained in the passage other than the flow path of the resin supply line. This results in suppressing the retained thermosetting resin from being cured and causing a problem with the operation of the gate valve. There is no need of cleaning the gate valve after each time of the flow of the thermosetting resin. This reduces the frequency of cleaning and thereby decreases the amount of waste of the thermosetting resin and the amount of cleaning liquid used.

[Aspect 4]

In the gate valve according to Aspect 3, the gate valve pin may have a first pin portion with a seal member provided thereon to seal between the gate valve pin and the sleeve, in a state where the gate valve pin is at the first pin position and the sleeve is at the second sleeve position. An injection hole-side end surface of the sleeve at the first sleeve position may be located on an opposite side of the injection hole across a seal position of the seal member in a state where the gate valve pin is at the first pin position. The second fluid flow path may be formed to include a front end-side partial flow path specified as a space by moving the sleeve from the second sleeve position to the first sleeve position in a state where the gate valve pin is at the first pin position.

According to the above configuration of the gate valve, in the state where the cleaning line is formed, the sealing position of the seal member is exposed on the front end-side partial flow path. Such exposure enables the sealing position of the seal member to be cleaned. The cleaning interferes with curing the thermosetting resin adhering to the seal member and suppresses a potential damage of the seal member by the cured thermosetting resin during move of the gate valve pin or the sleeve and resulting deterioration of the sealing performance. This results in enhancing the durability of the seal member and reducing the frequency of replacement of the seal member, thus reducing the workload.

[Aspect 5]

In the gate valve according to Aspect 4, the gate valve pin may have a second pin portion with a space formed therein as an inner partial flow path between the gate valve pin and an inner surface of the sleeve, wherein the second pin portion is located on an opposite side of the front end section across the first pin portion. The second fluid flow path may be formed to include a passage formed by connecting the front end-side partial flow path with the inner partial flow path.

According to the above configuration of the gate valve, the second fluid flow path is formed by using the space between the gate valve pin and the sleeve. Compared with the configuration of providing a passage for the second fluid flow path inside of the casing, this configuration reduces the size of the gate valve.

[Aspect 6]

In the gate valve according to Aspect 3, the sleeve may have a sleeve portion with a space formed therein as an outer partial flow path between the sleeve and a specific space-side inner surface of the casing. The second fluid flow path may be formed to include a passage formed by connecting the outer partial flow path with a front section-side partial flow path, which is a space specified by moving the sleeve from the second sleeve position to the first sleeve position in a state where the gate valve pin is at the first pin position.

According to the above configuration of the gate valve, the second fluid flow path is formed by using the space between the sleeve and the casing. Compared with the configuration of providing a passage for the second fluid flow path inside of the casing, this configuration reduces the size of the gate valve.

[Aspect 7]

In the gate valve according to Aspect 6, the gate valve pin may have: a first seal member provided to seal against the sleeve; and a second seal member located closer to the injection hole than the first seal member and provided to seal against the sleeve. In a state where the sleeve is at the second sleeve position and the gate valve pin is at the first pin position, the first seal member and the second seal member may serve to seal between the gate valve pin and the sleeve. In a state where the sleeve is at the first sleeve position and the gate valve pin is at the first pin position, only the first seal member out of the first and the second seal members may serve to seal between the gate valve pin and the sleeve. The second fluid flow path may be formed to include the front end-side partial flow path.

According to the above configuration of the gate valve, the second seal member exposed to the thermosetting resin is exposed on the front end-side partial flow path in the state where the cleaning line is formed. Such exposure enables the second seal member to be cleaned. The cleaning interferes with curing the thermosetting resin adhering to the second seal member and suppresses a potential damage of the second seal member by the cured thermosetting resin during move of the gate valve pin or the sleeve and resulting deterioration of the sealing performance. This results in enhancing the durability of the second seal member and reducing the frequency of replacement of the second seal member, thus reducing the workload.

[Aspect 8]

In the gate valve according to Aspect 1, the first fluid flow path may be formed inside of the casing or between the casing and the sleeve. The gate valve pin may have a third pin portion with a seal member provided thereon to seal between the gate valve pin and the sleeve in a state where the gate valve pin is at the first pin position and the sleeve is at the second sleeve position. An injection hole-side end surface of the sleeve at the first sleeve position may be located on an opposite side of the injection hole across a sealing position of the seal member in a state where the gate valve pin is at the first pin position. The second fluid flow path may be formed to include a front end-side partial flow path specified as a space by moving the sleeve from the second sleeve position to the first sleeve position in a state where the gate valve pin is at the first pin position.

The gate valve of the above configuration has the similar advantageous effects to those of the gate valve according to Aspect 1. In the state where the cleaning line is formed, the sealing position of the seal member is exposed on the front end-side partial flow path. Such exposure enables the sealing position of the seal member to be cleaned. The cleaning interferes with curing the thermosetting resin adhering to the seal member and suppresses a potential damage of the seal member by the cured thermosetting resin during move of the gate valve pin or the sleeve and resulting deterioration of the sealing performance. This results in enhancing the durability of the seal member and reducing the frequency of replacement of the seal member, thus reducing the workload. The configuration of Aspect 5 may be applied to the gate valve according to Aspect 8.

[Aspect 9]

There is provided a manufacturing method of a molded product of a thermosetting resin using the gate valve according to any one of Aspects 1 to 8. The manufacturing method comprising: a first step of providing a mold, which has a cavity in a specific shape corresponding to a shape of the molded product and on which the gate valve is mounted; a second step of sucking the air in the cavity in a state where the gate valve pin is at the first pin position and the sleeve is at the second sleeve position; a third step of moving the gate valve pin to the second pin position after the second step, to form the resin supply line and inject the thermosetting resin supplied through the first hole into the cavity; a fourth step of moving the gate valve pin to the first pin position after the third step, to block the resin supply line; a fifth step of waiting for a predefined time to cure the thermosetting resin injected in the cavity with application of heat; and a sixth step of moving the sleeve to the first sleeve position in the middle of the fifth step, to form the cleaning line so as to supply the cleaning liquid through the first fluid flow path and discharge the cleaning liquid through the second fluid flow path.

The above manufacturing method of the molded product of the thermosetting resin has the similar advantageous effects to those described above with regard to Aspects 1 to 8 cited by Aspect 9.

[Aspect 10]

In the manufacturing method of the molded product of the thermosetting resin according to Aspect 9, the sixth step may be performed in the middle of one fifth step out of a plurality of the fifth steps.

The above manufacturing method of the molded product of the thermosetting resin reduces the frequency of cleaning and thereby decreases the amount of waste of the thermosetting resin and the amount of cleaning liquid used.

The invention is not limited to the gate valve or the manufacturing method of the molded product of the thermosetting resin described above but may also be applied to a manufacturing apparatus of a molded product of a thermosetting resin and a cleaning method of a gate valve.

DETAILED DESCRIPTION OF EMBODIMENTS OF THE INVENTION

A. First Embodiment

Figure 1:
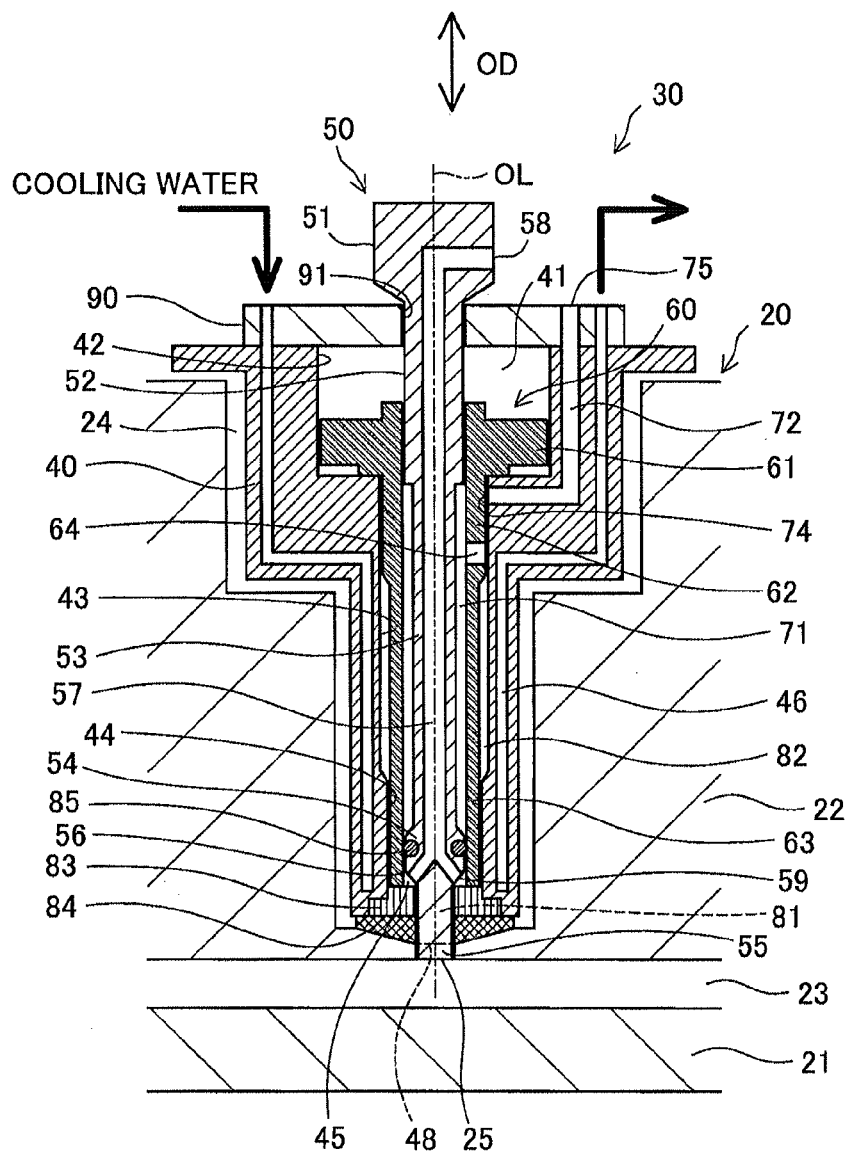
FIG. 1 is a diagram illustrating the schematic configuration of a gate valve 30 (at the valve-closing position) according to a first embodiment.

FIG. 1 illustrates the schematic configuration of a gate valve 30 as a first embodiment of the gate valve of the invention. FIG. 1 illustrates a cross section of the gate valve 30 taken on a cutting plane including an axis OL of a gate valve pin 50 described later. The gate valve 30 is mounted on a mold 20. The gate valve 30 is used to inject a thermosetting resin (hereinafter may be simply referred to as resin) into the mold 20 and is switched over to allow or block the flow of the resin. The mold 20 is used to mold the resin and manufacture a molded product. One gate valve 30 is mounted on one mold 20 according to this embodiment, but a plurality of gate valves 30 may alternatively be mounted on one mold 20. This embodiment describes an example of manufacturing a carbon fiber-reinforced plastic molded product using an epoxy resin as the matrix by RTM (resin transfer molding) method.

The mold 20 includes a lower mold 21 and an upper mold 22. A cavity 23 is formed between the lower mold 21 and the upper mold 22 as a space having a specific shape corresponding to the shape of a resulting molded product. The resin is injected into the cavity 23 by the gate valve 30 and is heated to be cured and give a molded product. Heating is performed by circulation of a heating medium through a heating medium flow path (illustration is omitted from FIG. 1) provided inside of the upper mold 22. A through hole 24 is formed inside of the upper mold 22 to pass through in a direction where the lower mold 21 and the upper mold 22 are aligned. The gate valve 30 is inserted into this through hole 24. A lower mold 21-side end of the two ends of the through hole 24 forms a resin inlet 25 through which the resin is injected into the cavity 23. In the description below, the side where the upper mold 22 is located is called upper side, and the side where the lower mold 21 is located is called lower side.

The gate valve 30 includes a casing 40, a gate valve pin 50 and a sleeve 60. The casing 40 is constructed by combining a plurality of cylinders having different diameters. This casing 40 has a hollow space. More specifically, a space 41 is provided inside of the casing 40 to be extended along the direction where the lower mold 21 and the upper mold 22 are aligned, i.e., the direction of the axis OL of the gate valve pin 50 described later (hereinafter referred to as axial direction OD). The space 41 is formed to pass through the casing 40 in the axial direction OD. In other words, the casing 40 has a ring shape. The upper side of the space 41 is covered with a stopper 90. A through hole 91 is formed in the central part of the stopper 90 to pass through in the axial direction OD. The through hole 91 has a circular cross section in this embodiment. The gate valve pin 50 is inserted into this through hole 91.

The casing 40 includes a large inner diameter section 42 having a largest inner diameter, a small inner diameter section 44 having a smallest inner diameter and a medium inner diameter section 43 having an inner diameter smaller than the inner diameter of the large inner diameter section 42 but larger than the inner diameter of the small inner diameter section 44. The large inner diameter section 42, the medium inner diameter section 43 and the small inner diameter section 44 are formed in the order of the large inner diameter section 42, the medium inner diameter section 43 and the small inner diameter section 44 in the direction from the upper side to the lower side. The outer diameters of the large inner diameter section 42 and the upper side of the medium inner diameter section 43 are larger than the outer diameters of the lower side of the medium inner diameter section 43 and the small inner diameter section 44.

A heat-conducting element 83 is inserted into the lower end of the casing 40 to fill the lower end of the space 41. The heat-conducting element 83 is made of a material having the higher thermal conductivity than that of the casing 40. According to this embodiment, a lower end surface of the casing 40 is flush with a lower end surface of the heat-conducting element 83 in relation to the axial direction OD. A heat-insulating element 84 is provided on the lower end surfaces of the casing 40 and the heat-conductive element 83. According to this embodiment, the heat-insulating element 84 is provided over half of the distance between the heat-conducting element 83 and the cavity 23 (resin inlet 25). A space 81 having a circular cross section orthogonal to the axis OL is formed inside of the heat-conducting element 83 and the heat-insulating element 84. A lower end of the space 81 forms a resin injection hole 48 as a resin outlet of the gate valve 30.

The upper mold 22 is air-tightly brought into contact with the heat-insulating element 84. Similarly the heat-insulating element 84 is air-tightly brought into contact with the heat-conducting element 83. In the state where the gate valve 30 is inserted in the through hole 24 of the upper hole 22, a small space is formed between the upper mold 22 and the outer surface of the casing 40 except the position where the heat-insulating element 84 is in contact with the upper mold 22. This small space serves as a heat-insulating layer. A heat insulator may be provided in this space.

The gate valve pin 50 is a rod-like member having a circular cross section orthogonal to the axis OL. The axis OL herein is defined as a centerline of the gate valve pin 50 that is parallel to the direction in which the rod-like gate valve pin 50 is extended. The gate valve pin 50 is coupled with an actuator, for example, a hydraulic cylinder (illustration is omitted from FIG. 1). The gate valve pin 50 is configured to be movable along the axial direction OD by the actuator. The gate valve pin 50 includes a rear end section 51, a first medium diameter section 52, a small diameter section 53, a second medium diameter section 54, a sloped section 56 and a front end section 55 from the upper side to the lower side. The rear end section 51 has a largest outer diameter. The outer diameter of the rear end section 51 is formed larger than the diameter of the through hole 91 formed in the stopper 90. The first medium diameter section 52 and the second medium diameter section 54 have outer diameters smaller than the outer diameter of the rear end section 51 but larger than the outer diameter of the small diameter section 53. The sloped section 56 is formed between the second medium diameter section 54 and the front end section 55. The sloped section 56 has outer diameter that is equal to the outer diameter of the second medium diameter section 54 at its upper end and is equal to the outer diameter of the front end section 55 at its lower end. In other words, the sloped section 56 has the outer diameter gradually tapered toward the lower side.

The front end section 55 has substantially the same outer diameter as that of the small diameter section 53 according to this embodiment. The outer diameter of this front end section 55 is formed slightly smaller than the space 81 formed in the heat-conducting element 83 and the heat-insulating element 84. In other words, the outer diameter of the front end section 55 is set such that the front end section 55 is movable in the state where the front end section 55 is substantially in contact with the inner surfaces of the heat-conducting element 83 and the heat-insulating element 84 that form the space 81. The front end section 55 is inserted into the space 81 to block the flow of the resin via the resin injection hole 48. When the front end section 55 is fully inserted into the space 81, i.e., when the lower end of the sloped section 56 comes into contact with the upper end surface of the heat-conducting element 83, the lower end surface of the front end section 55 is flush with the resin inlet 25 in relation to the axial direction OD.

The outer diameter of the first medium diameter section 52 is formed slightly smaller than the diameter of the through hole 91 of the stopper 90. In other words, the outer diameter of the first medium diameter section 52 is set such that the first medium diameter section 52 is movable in the state where the first medium diameter section 52 is substantially in contact with the inner diameter surface of the stopper 90. A seal member, for example, an O-ring (illustration is omitted from FIG. 1) is provided on the inner diameter surface of the stopper 90. The upper side of the space 41 is sealed with the stopper 90, the first medium diameter section 52 and the above seal member.

The outer diameter of the second medium diameter section 54 is formed slightly smaller than the inner diameter of the sleeve 60 described later. In other words, the outer diameter of the second medium diameter section 54 is set such that the second medium diameter section 54 is movable in the state where the second medium diameter section 54 is substantially in contact with the inner diameter surface of the sleeve 60. The second medium diameter section 54 has a seal member 85. More specifically, a groove is formed in the circumferential direction on the surface of the central part of the second medium diameter section 54. The seal member 85 is inserted in the groove. For example, an O-ring or a piston ring may be used for the seal member 85. The seal member 85 seals between the second medium diameter section 54 and the sleeve 60. This seal member 85 serves to suppress the resin from entering upward between the second medium diameter section 54 and the sleeve 60.

The gate valve pin 50 has a hollow space inside thereof to form a first fluid flow path 57. This first fluid flow path 57 is formed inside of the rear end section 51, the first medium diameter section 52, the small diameter section 53, the second medium diameter section 54 and the sloped section 56. The rear end section 51 located outside of the space 41, which is sealed with the stopper 90, has a first hole 58 formed at one end of the first fluid flow path 57. According to this embodiment, the first hole 58 is formed in a different surface from the upper end surface of the rear end section 51. More specifically, the first hole 58 is formed in a side surface of the rear end section 51 parallel to the axial direction OD. The sloped section 56 has second holes 59 formed at the other end of the first fluid flow path 57. In other words, the second holes 59 are formed immediately before the front end section 55 in the gate valve pin 50. According to this embodiment, the first fluid flow path 57 is branched into two passages inside of the second medium diameter section 54 to be symmetrical about the axis OL. There are accordingly two second holes 59.

The second holes 59 are formed to have a diameter slightly smaller than the length of the sloped section 56 at the cross section shown in FIG. 1. In other words, the length of the sloped section 56 is set to allow the second holes 59 to have the required diameter. According to this embodiment, the length of the sloped section 56 is not greater than twice the diameter of the second holes 59. The resin or a cleaning liquid flows through the second holes 59 (described later in detail). The diameter of the second holes 59 is accordingly set such that the flow rate and the pressure of the resin or the cleaning liquid are within desired ranges. As shown in FIG. 1, when the front end section 55 is fully inserted into the space 81, a space 45 is formed by the sloped section 56 of the gate valve pin 50, the lower end of the sleeve 60 described later and the heat-conducting element 83. The space 45 is an extremely small space formed by setting the length of the sloped section 56 as described above. The similar effect is obtained to some extent when the length of the sloped section 56 is, for example, not greater than five times the diameter of the second holes 59.

The sleeve 60 is provided outside of the gate valve pin 50 in the space 41. The sleeve 60 is in a ring shape having a through hole at the center thereof, and the gate valve ping 50 is inserted in this through hole. The sleeve 60 includes a large diameter section 61, a medium diameter section 62 and a small diameter section 63 from the upper side to the lower side. The large diameter section 61 has a largest outer diameter. The outer diameter of the large diameter section 61 is larger than the inner diameter of the medium inner diameter section 43 of the casing 40. The outer diameter of the central part of the large diameter section 61 is formed slightly smaller than the inner diameter of the large inner diameter section 42 of the casing 40. The inner diameter of the large diameter section 61 is formed slightly larger than the outer diameter of the first medium diameter section 52 of the gate valve pin 50. Seal members, for example, O-rings (illustration is omitted from FIG. 1) are provided to seal between the large diameter section 61 and the large inner diameter section 42 and between the large diameter section 61 and the first medium diameter section 52.

The medium diameter section 62 has an outer diameter larger than that of the large diameter section 61 but smaller than that of the small diameter section 63. The outer diameter of the medium diameter section 62 is formed slightly smaller than the inner diameter of the medium inner diameter section 43 of the casing 40. The medium diameter section 62 has a through hole 64 formed to pass through the medium diameter section 62 in a direction crossing the axial direction OD. A seal member, for example, an O-ring (illustration is omitted from FIG. 1) is provided at a position above the through hole 64 to seal between the medium inner diameter section 43 of the casing 40 and the medium diameter section 62. The outer diameter of the small diameter section 63 is formed slightly smaller than the inner diameter of the small inner diameter section 44 of the casing 40. The inner diameters of the large diameter section 61, the medium diameter section 62 and the small diameter section 63 are the same size and are formed slightly larger than the outer diameter of the first medium diameter section 52 of the gate valve pin 50.

This sleeve 60 is configured to be movable along the axial direction OD. The sleeve 60 is moved by controlling the atmospheric pressure in a specified part of the space 41 defined by the large diameter section 61 of the sleeve 60, the large inner diameter section 42 of the casing 40 and the stopper 90. More specifically, the stopper 90 has a through hole formed to pass through the axial direction OD, and a tube is inserted into the through hole (illustration is omitted from FIG. 1). A suction pump is connected with the tube via a changeover valve outside of the gate valve 30 (illustration is omitted from FIG. 1). The sleeve 60 is moved along the axial direction OD by controlling the opening-closing of the changeover valve and the ON-OFF of the suction pump. FIG. 1 shows the state that the sleeve 60 is moved to the lowermost position. In this state, the lower end surface of the sleeve 60 is in contact with the upper end surface of the heat-conducting element 83. The lower end surface of the large diameter section 61 of the sleeve 60 is in contact with the upper end surface of the medium inner diameter section 43 of the casing 40. As clearly understood from the above description, the gate valve pin 50 and the sleeve 60 are enabled to independently move along the axial direction OD.

In the gate valve 30 described above, a space 71 extended in the axial direction OD is formed between the small diameter section 53 of the gate valve pin 50 and the medium diameter section 62 and the small diameter section 63 of the sleeve 60. According to this embodiment, the space 71 is formed by making the outer diameter of the small diameter section 53 smaller than those of the other parts of the gate valve pin 50. A space 82 is formed between the medium inner diameter section 43 of the casing 40 and the small diameter section 63 of the sleeve 60. A partial flow path 72 is formed inside of the casing 40 and the stopper 90. The partial flow path 72 communicates the space 41 inside of the casing 40 with outside of the gate valve 30. More specifically, the partial flow path 72 runs from a hole 74 provided in the vicinity of the upper end of the inner surface of the medium inner diameter section 43 through the inside of the casing 40 and the stopper 90 to the outside of the stopper 90 via a hole 75.

A cooling flow path 46 is formed inside of the casing 40 over substantially the entire range of the axial direction OD. A cooling medium such as water is flowed through the cooling flow path 46. The cooling medium supplied through the stopper 90 flows from the upper side to the lower side of the cooling flow path 46, goes round a cross section other than the cross section of FIG. 1 in the circumferential direction of the axis OL in the neighborhood of the heat-conducting element 83, flows from the lower side to the upper side, and is discharged out of the stopper 90. Circulation of the cooling medium through the cooling flow path 46 suppresses heat released from the heating medium flow path provided inside of the upper mold 22 from being transferred to inside of the cooling flow path 46 formed in the casing 40. As a result, this suppresses curing of the resin or an increase in viscosity of the resin inside of the gate valve 30.

Figure 2:
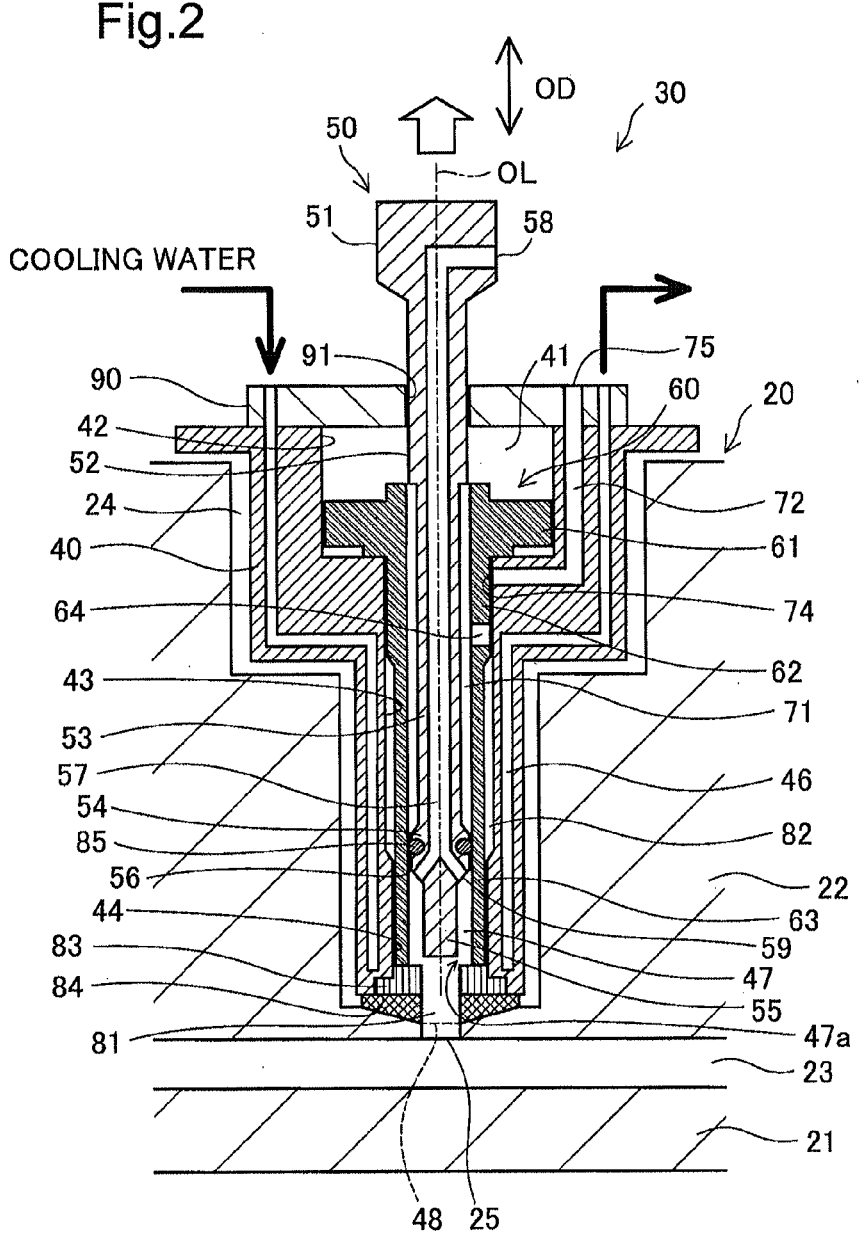
FIG. 2 is a diagram illustrating an operation of the gate valve 30.

FIG. 2 illustrates a state that the gate valve pin 50 is moved upward relative to the gate valve 30 shown in FIG. 1. The sleeve 60 is not moved from the state shown in FIG. 1. The gate valve pin 50 is moved to a position where the lower end surface of the front end section 55 is located above the upper end surface of the heat-conducting element 83 in relation to the axial direction OD. In other words, the gate valve pin 50 is moved to a position where a gap 47a appears between the front end section 55 and the heat-conducting element 83. Moving the gate valve pin 50 in this manner forms a space 47 around the front end section 55 or more specifically in the circumferential direction and below the front end section 55. At this position of the gate valve 30, the first fluid flow path 57 formed in the gate valve pin 50 communicates with the resin injection hole 48 through the space 47 and the space 81. In this state, the resin may be supplied through the first hole 58 at the outer end of the first fluid flow path 57 to be injected through the resin injection hole 48 into the cavity 23. The fluid passage formed by the first fluid flow path 57, the space 47 and the space 81 is called resin supply line.

Figure 3:
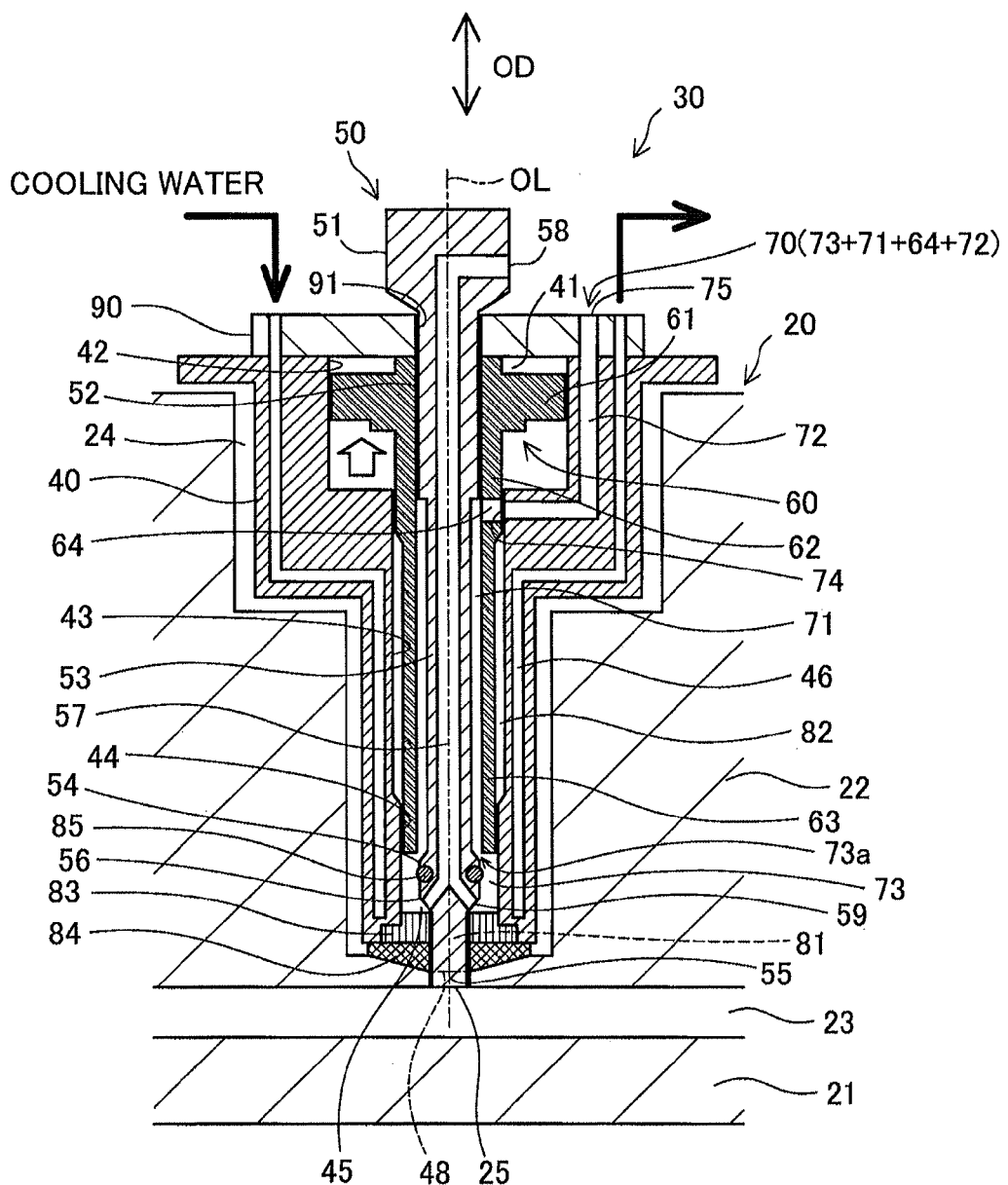
FIG. 3 is a diagram illustrating an operation of the gate valve 30.

FIG. 3 illustrates a state that the sleeve 60 is moved upward relative to the gate valve 30 shown in FIG. 1. The gate valve pin 50 is not moved from the state shown in FIG. 1. The sleeve 60 is moved to a position where the upper end surface of the large diameter section 61 is in contact with the lower end surface of the stopper 90. This means that the stopper 90 defines the stop position of the moving sleeve 60. At this position of the sleeve 60, the lower end surface of the sleeve 60 is located above the sealing position of the seal member 85 in relation the axial direction OD. In other words, the sleeve 60 is at the position where a gap 73a appears between the lower end surface of the sleeve 60 and the seal member 85. In this state, a space 73 is formed in the circumferential direction of the second medium diameter section 54 of the gate valve pin 50 by moving the sleeve 60 upward. The through hole 64 formed in the sleeve 60 is at such a position as to communicate with the partial flow path 72 formed in the casing 40. Additionally, the through hole 64 is at the position overlapping with the space 71 in relation to the axial direction OD. According to this embodiment, the through hole 64 is at the position overlapping with the upper end of the space 71. According to this positional relationship, in the state where the gate valve pin 50 and the sleeve 60 are at the positions shown in FIG. 3, a flow path is formed to communicate the space 73, the space 71 and the through hole 64 with the partial flow path 72. This communicating flow path is called a second fluid flow path 70.

In the state where the second fluid flow path 70 is formed, as shown in FIG. 3, the second holes 59 formed in the gate valve pin 50 communicate with the second fluid flow path 70. The first fluid flow path 57 formed in the gate valve pin 50 accordingly communicates with the second fluid flow path 70 via the space 45. In this state, a cleaning liquid may be supplied through the first hole 58 at the outer end of the first fluid flow path 57 to clean the first fluid flow path 57. An organic solvent is generally used for the cleaning liquid. The seal member 85 is exposed on the second fluid flow path 70 and is thus also cleaned. A fluid passage formed by the first fluid flow path 57, the space 45 and the second fluid flow path 70 is called cleaning line.

In the above positions of the gate valve pin 50 shown in FIGS. 1 to 3, the position shown in FIGS. 1 and 3 is called first pin position. The position of the gate valve pin 50 shown in FIG. 2 is called second pin position. The first pin position is the position where the front end section 55 of the gate valve pin 50 closes the resin injection hole 48. The second pin position is the position where the front end section 55 opens the resin injection hole 48. In the above positions of the sleeve 60 shown in FIGS. 1 to 3, the position shown in FIG. 3 is called first sleeve position. The position of the sleeve 60 shown in FIGS. 1 and 2 is called second sleeve position. The first sleeve position is the position where the second fluid flow path 70 is formed. The second sleeve position is the position where the second fluid flow path 70 is not formed, i.e., communication between the first fluid flow path 57 and the second fluid flow path 70 is blocked. As clearly understood from the above description, when the sleeve 60 is moved from the second sleeve position to the first sleeve position, the space 73 at the second hole 59-side end of the second fluid flow path 70 is blocked by the sleeve 60.

Figure 4:
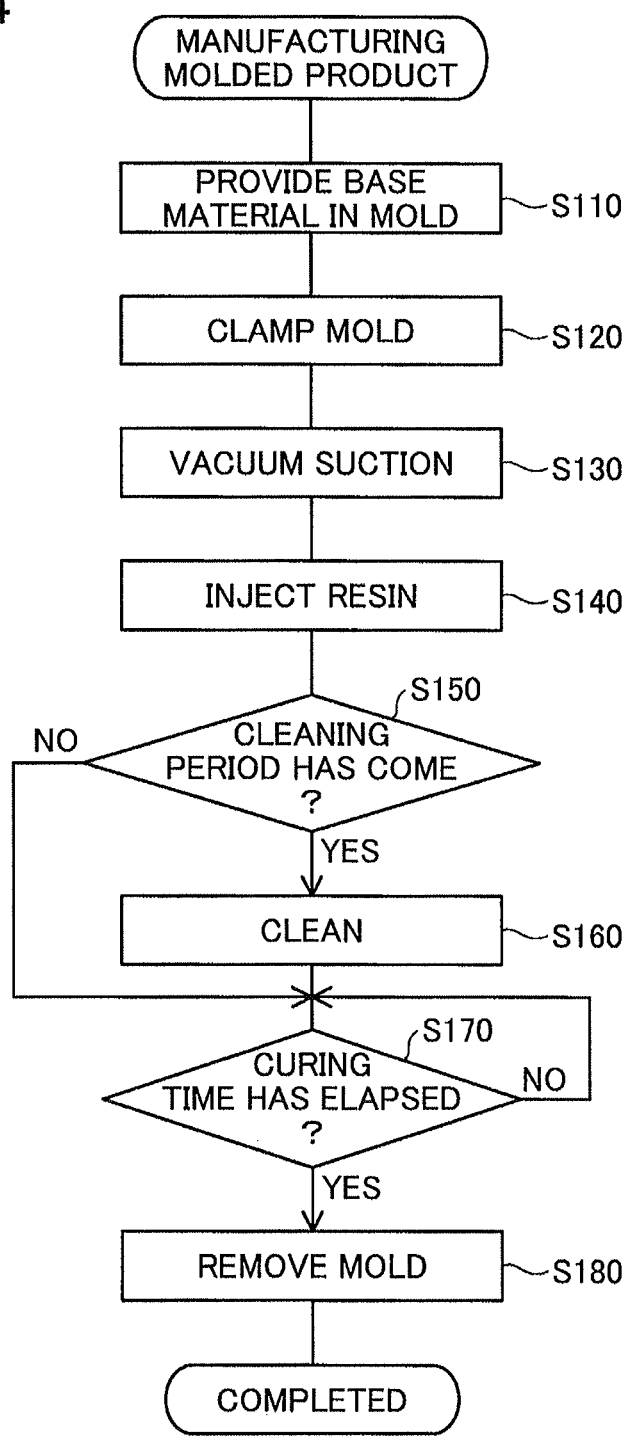
FIG. 4 is a flowchart showing a procedure of manufacturing a molded product of a thermosetting resin using the gate valve 30.

FIG. 4 illustrates a procedure of manufacturing a resin molded product using the gate valve 30 described above. According to this embodiment, the molded product manufacturing process is automated, and a plurality of molded products are repeatedly and successively manufactured at specified cycles (for example, 20 minutes). FIG. 4 shows one cycle of manufacturing one molded product. The molded product manufacturing process provides a carbon fiber-containing base material in the cavity 23 of the mold 20 (step S110). This base material is molded in advance to a shape corresponding to the shape of a resulting molded product. After providing the base material, the process clamps the mold 20 (step S120). A tube is air-tightly connected with the first hole 58 formed at the gate valve pin 50, although illustration is omitted. The tube is connected with a resin storage tank for storing the resin, a cleaning liquid storage tank for storing the cleaning liquid and an air pump in parallel via a changeover valve. The changeover valve selectively changes over the state of the first hole 58 among the states that the first hole 58 communicates with only one of the resin storage tank, the cleaning liquid storage tank and the air pump and the state that the first hole 58 does not communicate with any of the resin storage tank, the cleaning liquid storage tank and the air pump.

After clamping the mold, the process sucks the inside of the cavity 23 by a vacuum pump (step S130). Suction evacuates the inside of the cavity 23 to a vacuum and suppresses the air from being contained in the resulting molded product.

Figure 6:
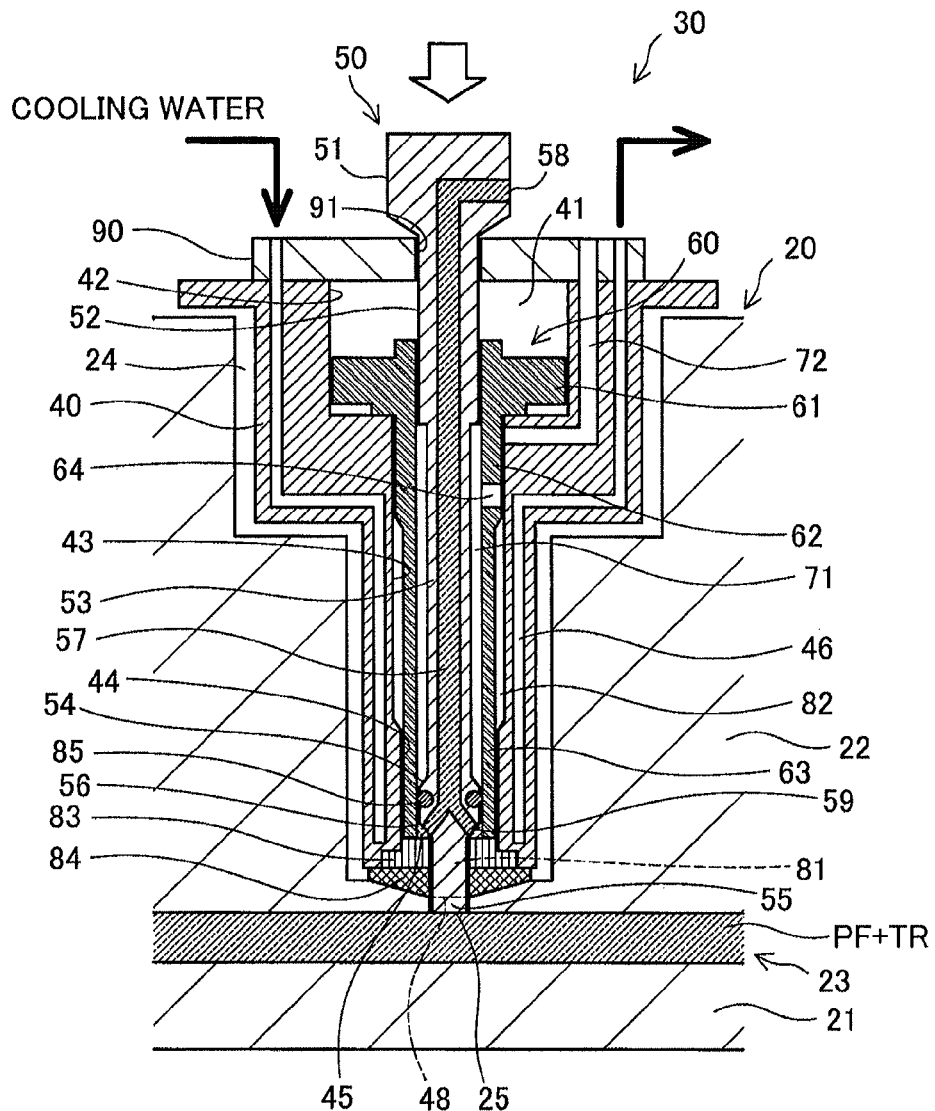
FIG. 6 is a diagram illustrating a state of the gate valve 30 (on completion of injection of thermosetting resin)

In the case of manufacturing a molded product first (in a first cycle), suction is applied in the state where the gate valve pin 50 is at the second pin position and the sleeve 60 is at the second sleeve position, i.e., in the state shown in FIG. 2 (the state where the resin supply line is formed). In this state, the changeover valve in the upstream of the first hole 58 is closed. This evacuates the inside of the resin supply line (the first fluid flow path 57, the space 47 and the space 81) in addition to the cavity 23 to a vacuum. In a second or subsequent cycle, suction is applied in the state where the gate valve pin 50 is at the first pin position and the sleeve 60 is at the second sleeve position, i.e., in the state shown in FIG. 1 (the state where the front end section 55 closes the resin injection hole 48). In this state, the resin adhering to the front end section 55 at step S140 described later is cured between the resin injection hole 48 and the resin inlet 25 with the heat transferred from the upper mold 22, so as to seal between the front end section 55 and the upper mold 22. Only the cavity 23 is accordingly evacuated to a vacuum. The first fluid flow path 57 and the space 45 are filled with the resin as shown in FIG. 6 described later.

Figure 5:
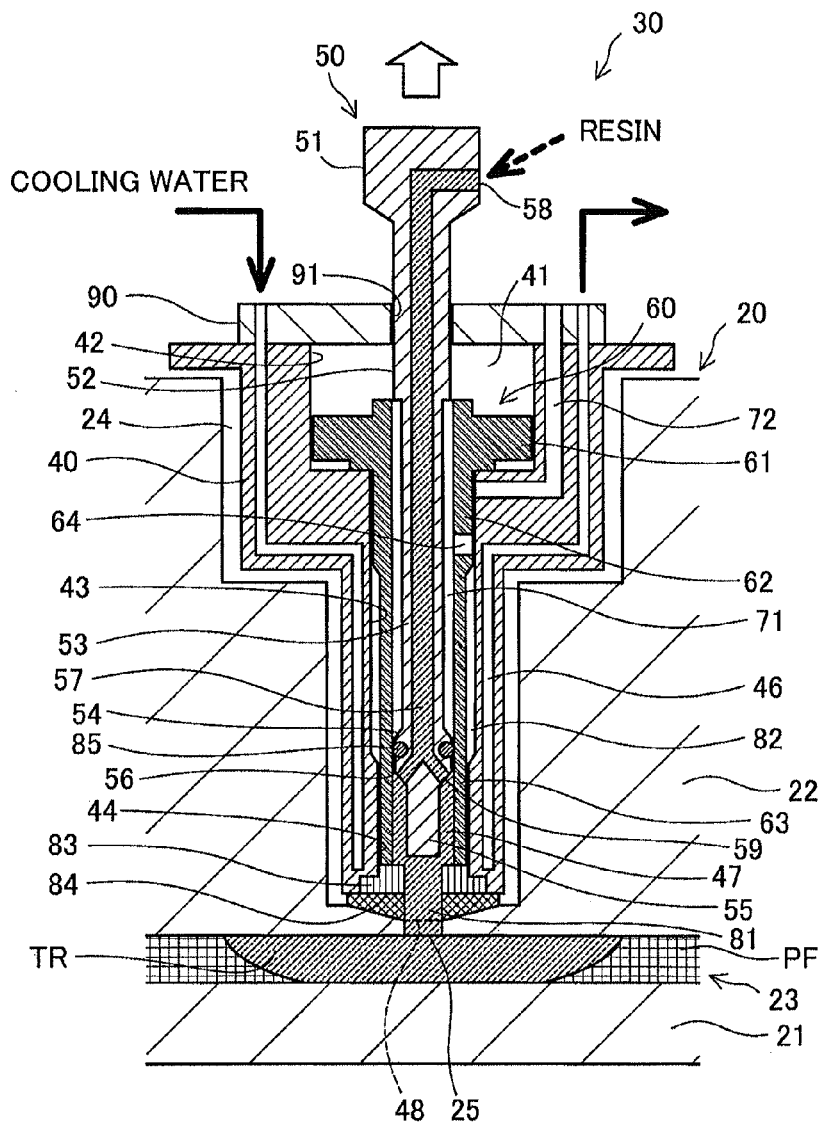
FIG. 5 is a diagram illustrating a state of the gate valve 30 (during injection of thermosetting resin)

After applying suction, the process supplies the resin through the first hole 58 and injects the resin into the cavity 23 through the resin supply line (step S140). FIG. 5 illustrates a state of the gate valve 30 during injection of the resin. As illustrated, the resin is injected in the state where the gate valve pin 50 is at the second pin position and the sleeve 60 is at the second sleeve position. In this state, the resin supply line (the first fluid flow path 57, the space 47 and the space 81) is formed, while the cleaning line (the first fluid flow path 57, the space 45 and the second fluid flow path 70 shown in FIG. 3) is not formed. In the state where the gate valve pin 50 is at the first pin position at step S130, the gate valve pin 50 is moved from the first pin position to the second pin position. FIG. 5 illustrates the state that a resin TR is injected through the resin supply line into the cavity 23 in which a base material PF is provided. A required amount of the resin TR is injected such that the base material PF is impregnated with the resin TR and the resin TR is spread over the entire cavity 23.

On completion of injecting the resin TR, the resin supply line is blocked. FIG. 6 illustrates a state that injection of the resin TR is completed and the resin supply line is blocked. The gate valve pin 50 is moved from the second pin position to the first pin position. The first fluid flow path 57 and the space 45 are filled with the resin TR. The resin TR injected into the cavity 23 is left to stand in the cavity 23 for a time required for curing the resin TR with heat transferred from the upper mold 22 (hereinafter referred to as curing time).

After the resin supply line is blocked, the process subsequently determines whether a cleaning period has come (step S150). This determination is made by a control device that controls manufacture of molded products. The cleaning period is specified in advance to such a time that an increase in viscosity of the resin retained in or adhering to the resin flow passage does not interfere with the functions of the gate valve 30. The cleaning period may be set to, for example, 4 hours (12 cycles). When it is determined that the cleaning period has come (step S150: YES), the gate valve 30 is cleaned (step S160). This cleaning process is performed during the curing time. This means that the waiting time for curing the resin is used for the cleaning process.

Figure 7:
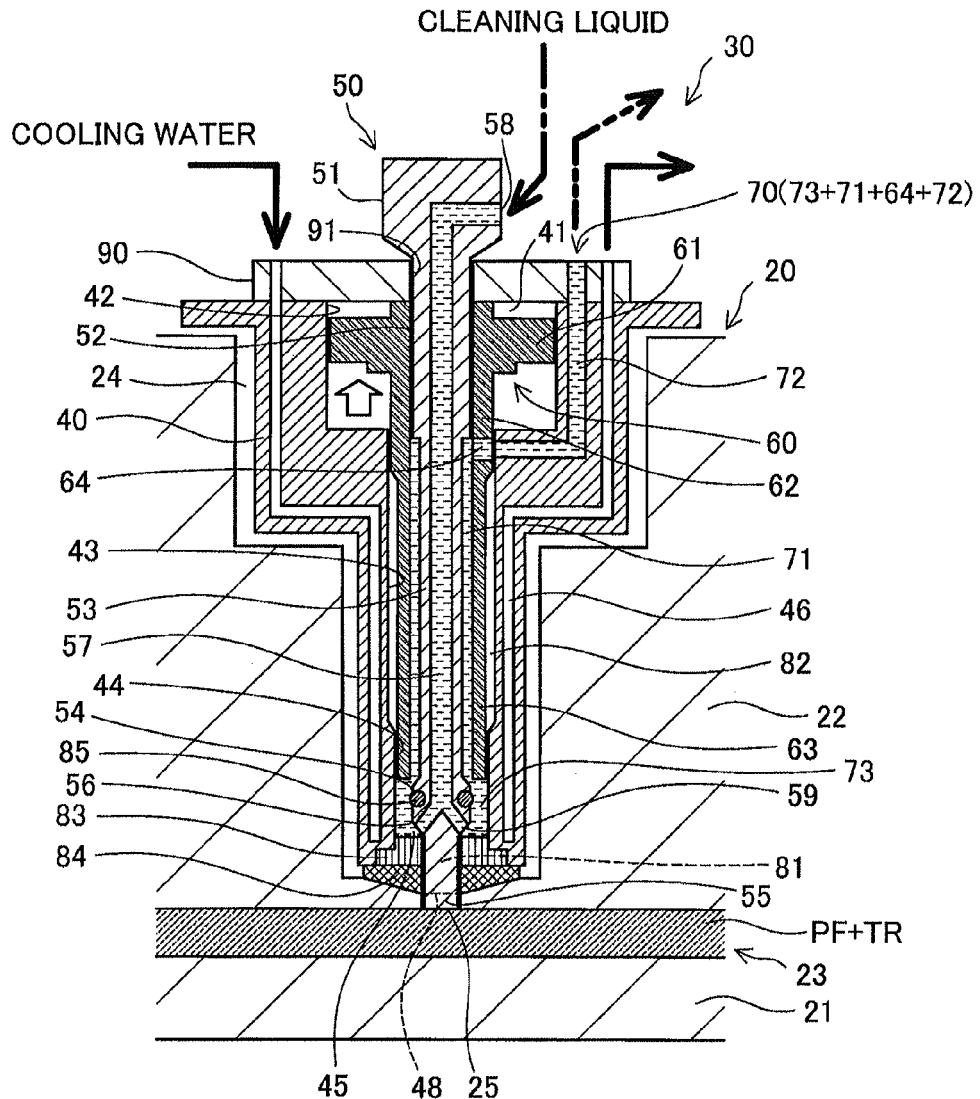
FIG. 7 is a diagram illustrating a state of the gate valve 30 (during cleaning)

FIG. 7 illustrates a state of the gate valve 30 during cleaning. As illustrated, the cleaning process is performed in the state where the gate valve pin 50 is at the first pin position and the sleeve 60 is at the first sleeve position. In this state, the cleaning line (the first fluid flow path 57, the space 45 and the second fluid flow path 70 shown in FIG. 3) is formed, while the resin supply line (the first fluid flow path 57, the space 47 and the space 81 shown in FIG. 2) is not formed. More specifically, after the gate valve pin 50 is moved to the first pin position on completion of injecting the resin, the sleeve 60 is moved from the second sleeve position to the first sleeve position. FIG. 7 illustrates the state that the gate valve 30 is cleaned through the formed cleaning line. The cleaning process supplies the cleaning liquid through the first hole 58 and keeps the state that the cleaning line is filled with the cleaning liquid for a predefined time. The cleaning process subsequently supplies the air through the first hole 58 for air blowing. Keeping the filling state of the cleaning liquid and air blowing may be repeated a plurality of times. As clearly shown in FIG. 7, the cleaning process cleans the seal member 85, in addition to the first fluid flow path 57 used as part of the resin supply line.

On completion of cleaning, the process waits until the curing time has elapsed (step S170). After the curing time has elapsed (step S170: YES), the process removes the mold and takes out a molded product (step S180). This completes one molded product. In the case that the cleaning process is performed, at step S130 in a next cycle, suction is applied in the state where the gate valve pin 50 is at the second pin position and the sleeve 60 is at the second sleeve position, like the first cycle described above.

In the gate valve 30 described above, the resin inlet corresponds to the injection hole of the claims. The seal member 85 corresponds to the seal member of the claims. The space 73 corresponds to the front end-side partial flow path of the claims. The space 71 corresponds to the inner partial flow path of the claims. The second medium diameter section 54 corresponds to the first pin portion of the claims. The small diameter section 53 corresponds to the second pin portion of the claims.

According to the configuration of the gate valve 30 described above, moving the gate valve pin 50 to the second pin position (FIG. 5) from the state that the gate valve pin 50 is at the first pin position and the sleeve 60 is at the second sleeve position (FIG. 1) allows the flow of the resin through the resin supply line into the cavity 23. Subsequently moving the gate valve pin 50 to the first pin position (FIG. 6) blocks the flow of the resin through the resin supply line into the cavity 23. Subsequently moving the sleeve 60 to the first sleeve position (FIG. 7) forms the cleaning line to clean the gate valve 30, while blocking the resin supply line. In this manner, the gate valve 30 can be cleaned by using the curing time of the resin supplied into the cavity 23.

According to the configuration of the gate valve 30, after completion of cleaning the gate valve 30 through the cleaning line, moving the sleeve 60 to the second sleeve position blocks the cleaning line (FIG. 1). Subsequently moving the gate valve pin 50 to the second pin position (FIG. 2) again allows the flow of the resin through the resin supply line into the cavity 23. In this manner, control is made to prevent the resin supply line and the cleaning line from being formed simultaneously. As a result, this suppresses the air from entering from the cleaning line to the resin supply line. This also prevents the thermosetting resin retained in the resin supply line from leaking to the cleaning line in the course of blocking the resin supply line.

According to the configuration of the gate valve 30, the resin supply passage, i.e., the first fluid flow path 57, is formed inside of the gate valve pin 50. This simplifies the device configuration. Compared with other configurations, for example, configurations of forming a resin supply passage inside of the casing 40 and forming a resin supply passage between the casing 40 and the sleeve 60, this configuration allows for reduction of the outer diameter of the gate valve 30. As a result, this enables the middle area and the outer area of the gate valve 30 to be equally cooled.

According to the configuration of the gate valve 30, the end (space 73) on the upstream side (second hole 59-side) of the second fluid flow path 70 is blocked in the state where the sleeve 60 is at the second sleeve position. Accordingly, this allows the resin to be flowed through the resin injection hole 48 in the state where the sleeve 60 is at the second sleeve position and suppresses the resin from being retained in the second fluid flow path 70 by subsequently blocking the resin supply line. This suppresses the resin from being retained in the passage other than the flow path of the resin supply line. This results in suppressing the retained resin from being cured and causing a problem with the operation of the gate valve 30. This also prevents an increase in viscosity of the resin retained in the second fluid flow path 70 and accordingly does not need cleaning after each time of the flow of the resin. This reduces the frequency of cleaning and thereby decreases the amount of waste of the resin and the amount of cleaning liquid used.

According to the configuration of the gate valve 30, the seal member 85 is provided not on the sleeve 60 but on the gate valve pin 50. In the state where the cleaning line is formed, the seal member 85 is exposed on the space 73 that constitutes part of the second fluid flow path 70 (FIG. 7). Such exposure enables the sealing position of the seal member 85 to be cleaned. The cleaning interferes with curing the resin adhering to the seal member 85 and suppresses a potential damage of the seal member 85 by the cured resin during move of the gate valve pin 50 or the sleeve 60 and resulting deterioration of the sealing performance. This results in enhancing the durability of the seal member 85 and reducing the frequency of replacement of the seal member 85, thus reducing the workload.

According to the configuration of the gate valve 30, the second fluid flow path 70 is formed by using the space 71 between the gate valve pin 50 and the sleeve 60 (FIG. 3). Compared with the configuration of providing a passage for the second fluid flow path 70 inside of the casing 40, this configuration reduces the size of the gate valve 30. More specifically, this reduces the width of the casing 40 in the direction crossing the axis OL. The space 71 is formed by decreasing the diameter of the small diameter section 53 of the gate valve pin 50 than the diameters of the other sections according to this embodiment, but this is not restrictive. For example, part of the space 71 may be formed by increasing the inner diameter of part of the sleeve 60 than the inner diameters of the other parts. This narrows the range of the small diameter section 53 and thereby enhances the strength of the gate valve pin 50.

According to the configuration of the gate valve 30, the sloped section 56 is provided between the second medium diameter section 54 and the front end section 55, and the second holes 59 are formed in the sloped section 56. Only the space 45 other than the first fluid flow path 57 is the place where the resin can be retained after blocking the resin supply line. The space 45 is an extremely small space, so that this reduces the amount of the resin retained.

According to the configuration of the gate valve 30, the resin injection hole 48 is formed by the heat-insulating element 84. On the upper side of the resin injection hole 48, the heat-insulating element 84 restricts the heat transfer to inside of the gate valve 30 and accordingly suppresses the resin adhering to the front end section 55 from being cured. This effect is made more prominent by providing the heat-conducting element 83 above the heat-insulating element 84 to accelerate the cooling effect of the cooling medium flowing through the cooling flow path 46. Such configuration reduces the adhesion between the front end section 55 and the heat-conducting element 83 or the heat-insulating element 84. As a result, this enables the gate valve pin 50 from being favorably moved from the first pin position to the second pin position.

According to the configuration of the gate valve 30, the cleaning liquid is used in the closed system. Even when an organic solvent is used as the cleaning liquid, this configuration suppresses the organic solvent from being exposed to the air and improves the safety.

According to the configuration of the gate valve 30, the space 82 is formed between the sleeve 60 and the casing 40. Even if a little amount of resin enters between the sleeve 60 and the casing 40 and is cured, the cured resin moves upward along with the move of the sleeve 60 in the axial direction OD and is accumulated in the space 82. In other words, the space 82 serves as a buffer for the cured resin. As a result, compared with the configuration of the gate valve 30 without the space 82, this configuration increases the tolerance for the resin entering between the sleeve 60 and the casing 40. Additionally, this reduces the frequency of maintenance operation to remove the cured resin.

B. Second Embodiment

Figure 8:
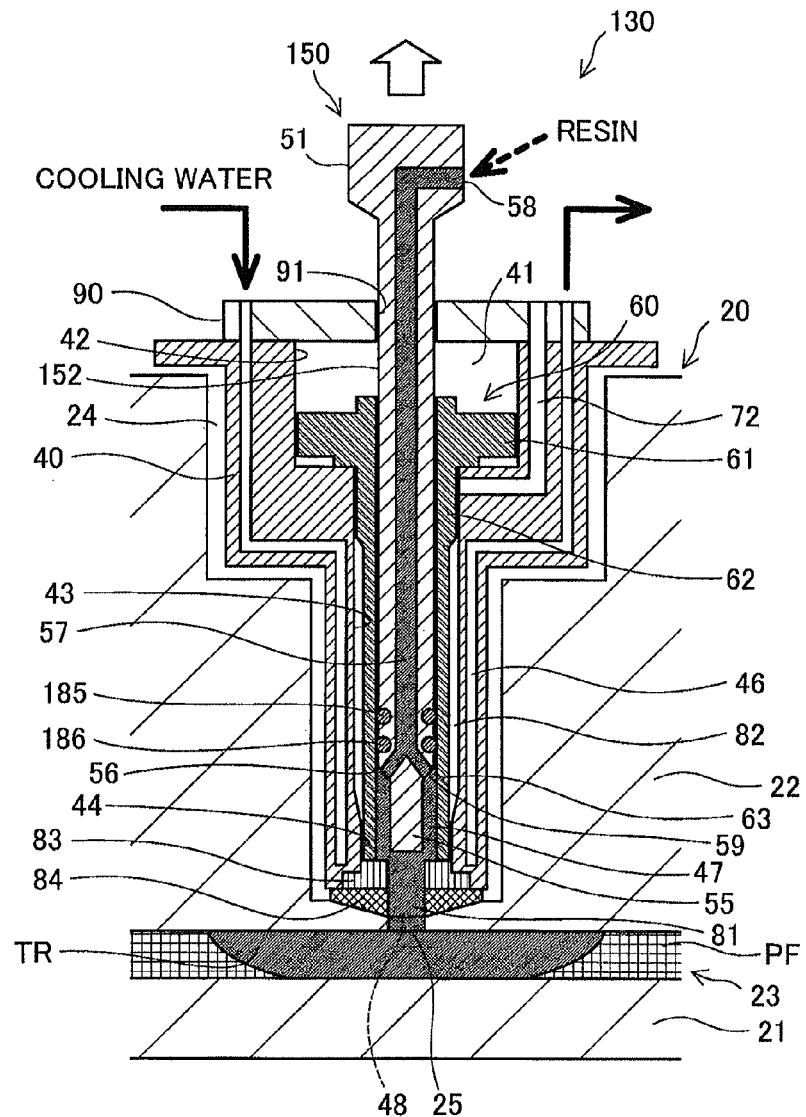
FIG. 8 is a diagram illustrating a state of a gate valve 130 (during injection of thermosetting resin) according to a second embodiment.

FIG. 8 illustrates the schematic configuration of a gate valve 130 as a second embodiment of the gate valve of the invention. FIG. 8 corresponds to FIG. 5 of the first embodiment. More specifically, FIG. 8 illustrates the state of the gate valve 130 during injection of the resin into the cavity 23. The gate valve 130 of the second embodiment differs from the gate valve 30 of the first embodiment by only the pathway of the cleaning line and the relevant configuration and otherwise has the common configuration with that of the gate valve 30. The following describes only the differences from the first embodiment and does not specifically describe the common configuration with the first embodiment. The like components of FIG. 8 to those of the first embodiment (FIG. 5) are shown by the like numerical symbols to those of FIG. 1.

The gate valve 130 has a gate valve pin 150 including the rear end section 51, a middle section 152, the sloped section 56 and the front end section 55 from the upper side to the lower side. The middle section 152 has an outer diameter formed slightly smaller than the inner diameter of the sleeve 60. The gate valve 130 does not have the small diameter section 63 unlike the first embodiment and has a fixed diameter section (having the diameter of the second medium diameter section 54 of the first embodiment) between the rear end section 51 and the sloped section 56. A first seal member 185 and a second seal member 186 are provided in the vicinity of the lower end of the middle section 152. The second seal member 186 is provided below the first seal member 185.

In the state of FIG. 8, the gate valve pin 150 is at a relatively upper second pin position, and the sleeve 60 is at a relatively lower second sleeve position, so that the first fluid flow path 57, the space 47, the space 81 and the resin injection hole 48 communicate with one another to form the resin supply line. The pathway of the resin supply line is the same as that of the first embodiment. In this state, the lower end surface of the sleeve 60 is located below the first seal member 185 and the second seal member 186 in relation to the axial direction OD. Accordingly, the first seal member 185 and the second seal member 186 serve to seal between the gate valve pin 150 and the sleeve 60.

Figure 9:
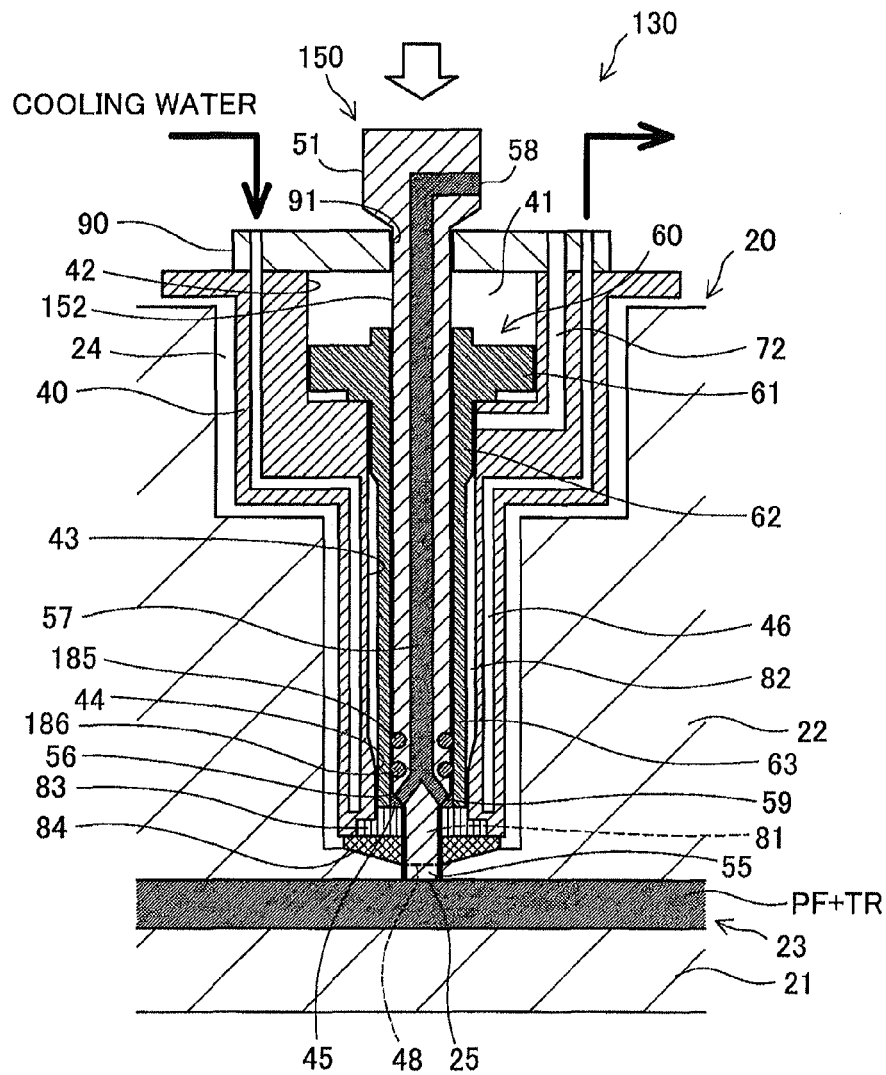
FIG. 9 is a diagram illustrating a state of the gate valve 130 (on completion of injection of thermosetting resin)

FIG. 9 illustrates a state of the gate valve 130 that injection of the resin is completed and the resin supply line is blocked. FIG. 9 corresponds to FIG. 6 of the first embodiment. As shown in FIG. 9, compared from the state of FIG. 8, the gate valve pin 150 is moved from the second pin position (FIG. 8) to the lower first pin position, while the sleeve 60 is kept at the second sleeve position. This results in blocking the resin supply line.

Figure 10:
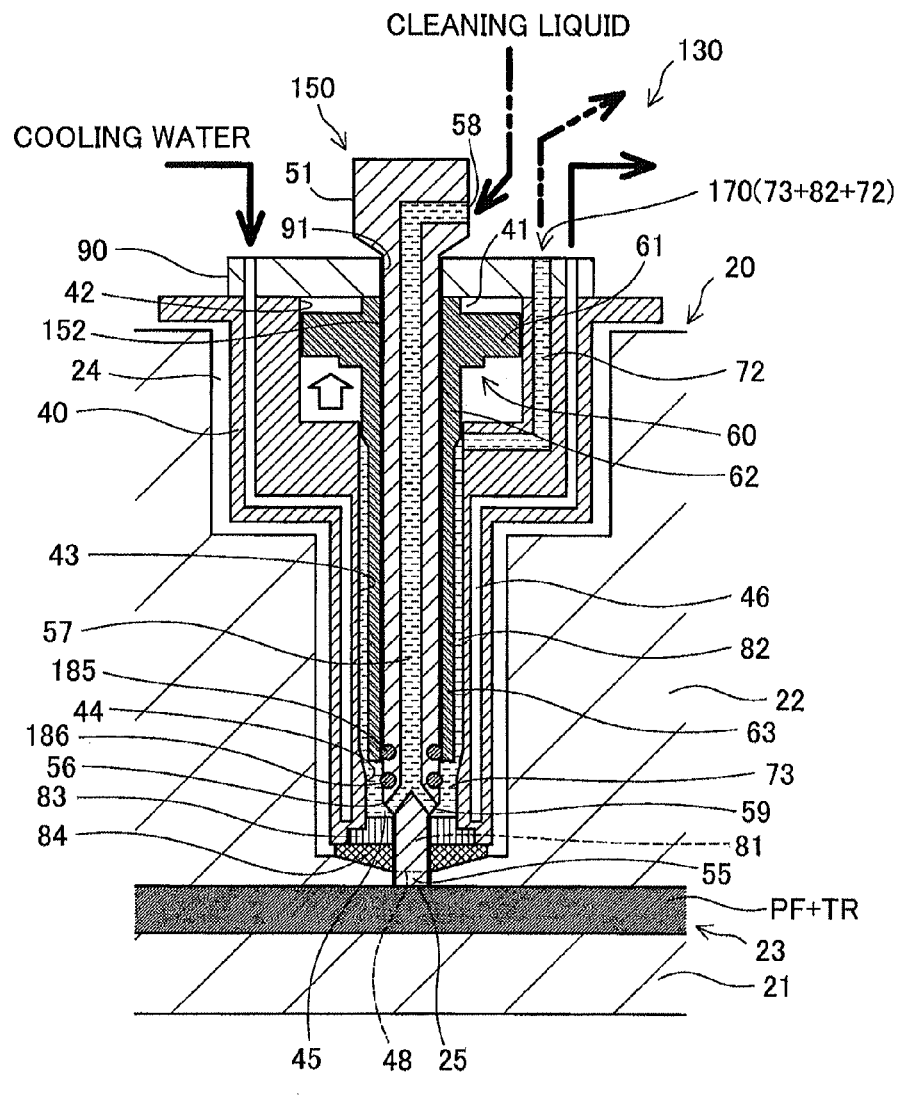
FIG. 10 is a diagram illustrating a state of the gate valve 130 (during cleaning)

FIG. 10 illustrates a state of the gate valve 130 during cleaning. FIG. 10 corresponds to FIG. 7 of the first embodiment. As shown in FIG. 10, compared from the state of FIG. 9, the sleeve 60 is moved from the second sleeve position to the upper first sleeve position, while the gate valve pin 150 is kept at the first pin position. In this state, the lower end surface of the sleeve 60 is located above the second seal member 186 but is located below the sealing position of the first seal member 185 in relation to the axial direction OD. Only the first seal member 185 out of the first and the second seal members 185 and 186 accordingly serves to seal between the gate valve pin 150 and the sleeve 60. As a result, the second seal member 186 is exposed on the space 73.

Moving the sleeve 60 upward to above the lower end of the space 82 forms the space 73 and causes the space 73 to communicate with the space 82. Similarly, moving the sleeve 60 upward extends the space 82 upward and causes the space 82 to communicate with the partial flow path 72. According to this embodiment, the end of the space 82 communicates with the partial flow path 72. This positional relationship causes the space 73, the space 82 and the partial flow path 72 to communicate with one another and forms a second fluid flow path 170. FIG. 10 illustrates the state that the gate valve 130 is cleaned by using the cleaning line formed by the first fluid flow path 57, the space 45 and the second fluid flow path 170.

According to the configuration of the gate valve 130 described above, the space 82 corresponds to the outer partial flow path of the claims. The small diameter section 63 corresponds to the sleeve portion of the claims. The first seal member 185 corresponds to the first seal member of the claims. The second seal member 186 corresponds to the second seal member of the claims.

The configuration of the gate valve 130 suppresses the air from being contained in a resulting molded product and additionally enables the gate valve to be cleaned by using the curing time, like the first embodiment. The second fluid flow path 170 is formed by using the space 82 between the sleeve 60 and the casing 40. Compared with the configuration of providing a passage for the second fluid flow path inside of the casing 40, this configuration reduces the size of the gate valve 130. The second seal member 186 exposed to the resin is exposed on the space 73 hat constitutes part of the second fluid flow path 170, so that the seal position of the second seal member 186 can be cleaned. This results in enhancing the durability of the second seal member 186 and reducing the frequency of replacement of the second seal member 186, thus reducing the workload.

C. Third Embodiment

Figure 11:
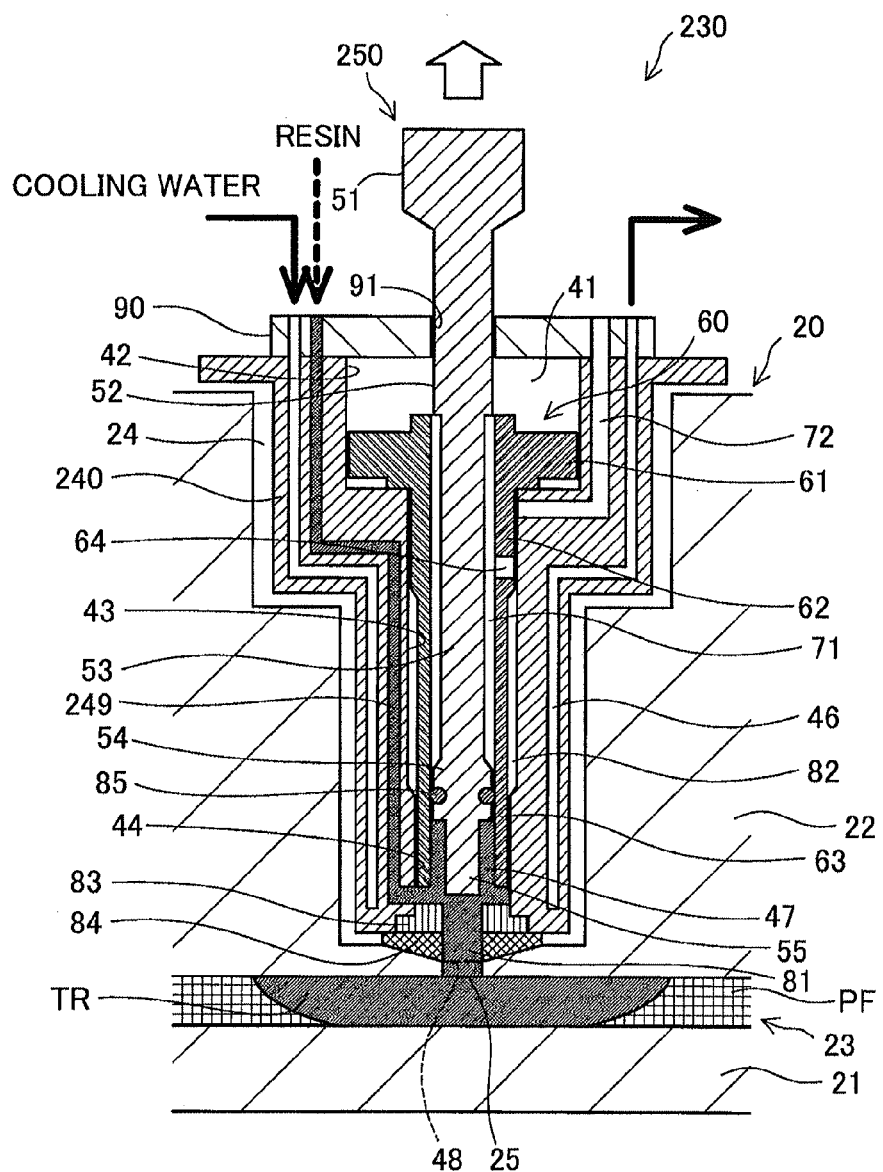
FIG. 11 is a diagram illustrating a state of a gate valve 230 (during injection of thermosetting resin) according to a third embodiment.

FIG. 11 illustrates the schematic configuration of a gate valve 230 as a third embodiment of the gate valve of the invention. FIG. 11 corresponds to FIG. 5 of the first embodiment. More specifically, FIG. 11 illustrates the state of the gate valve 230 during injection of the resin into the cavity 23. The gate valve 230 of the third embodiment differs from the gate valve 30 of the first embodiment by only the pathway of the resin supply line and the relevant configuration and otherwise has the common configuration with that of the gate valve 30. The following describes only the differences from the first embodiment and does not specifically describe the common configuration with the first embodiment. The like components of FIG. 11 to those of the first embodiment (FIG. 5) are shown by the like numerical symbols to those of FIG. 1.

A gate valve pin 250 of the gate valve 230 differs from the gate valve pin 50 of the first embodiment by omission of the sloped section 56. The lower end of the second medium diameter section 54 is tapered in the direction perpendicular to the axial direction OD to have the smaller diameter and coupled with the front end section 55. In other words, the lower end surface of the second medium diameter section 54 is formed parallel to the upper end surface of the heat-conducting element 83. The gate valve pin 250 is solid, unlike the gate valve pin 50 of the first embodiment. This means that the gate valve pin 250 is formed without the first fluid flow path 57, the first hole 58 and the second holes 59 of the first embodiment.

A casing 240 of the gate valve pin 250 differs from the casing 40 of the first embodiment by a first fluid flow path 249 provided inside of the casing 240. The first fluid flow path 249 is formed along the axial direction OD on the inner side (gate valve pin 50-side) of the cooling flow path 46. The first fluid flow path 249 is also formed below the sleeve 60 at the second sleeve position and above the heat-insulating element 84 in the direction crossing the axial direction OD to communicate with the space 47. In the state of FIG. 11, the gate valve pin 250 is at the upper second pin position, and the sleeve 60 is at the lower second sleeve position, so that the first fluid flow path 249, the space 47, the space 81 and the resin injection hole 48 communicate with one another to form the resin supply line.

Figure 12:
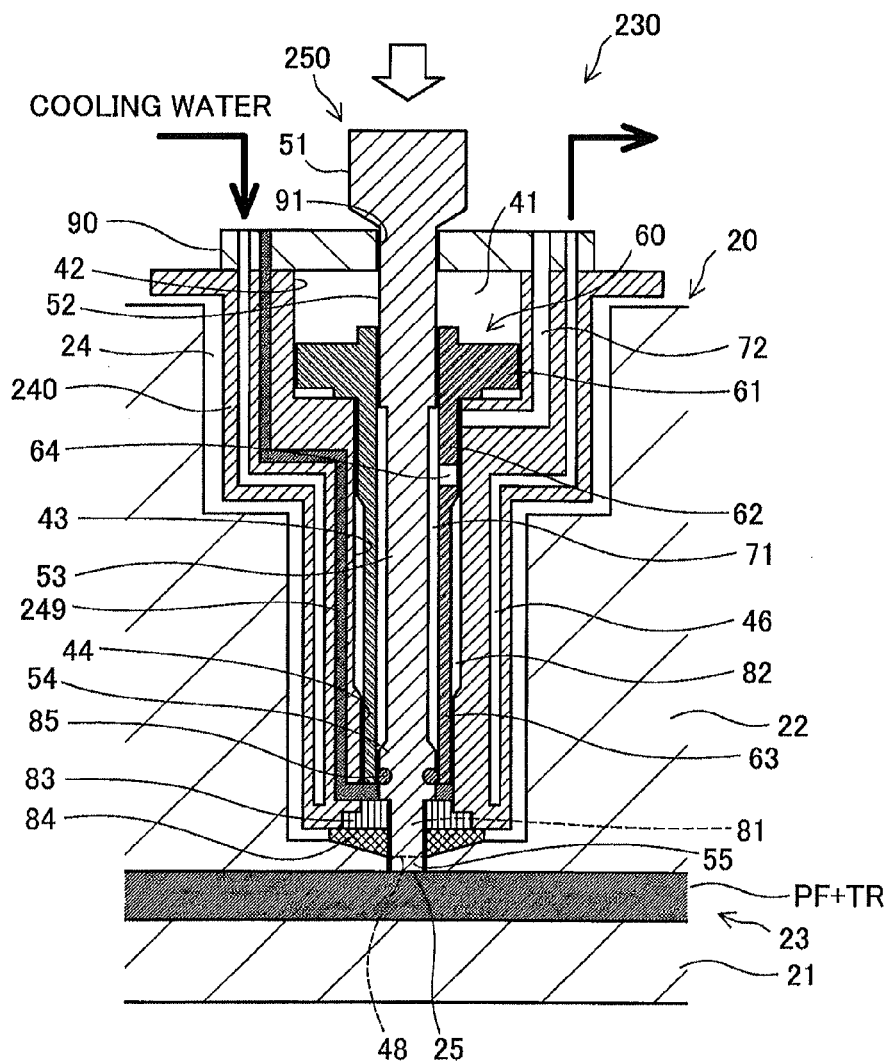
FIG. 12 is a diagram illustrating a state of the gate valve 230 (on completion of injection of thermosetting resin)

FIG. 12 illustrates a state of the gate valve 230 that injection of the resin is completed and the resin supply line is blocked. FIG. 12 corresponds to FIG. 6 of the first embodiment. As shown in FIG. 12, compared from the state of FIG. 11, the gate valve pin 250 is moved from the second pin position (FIG. 11) to the lower first pin position, while the sleeve 60 is kept at the second sleeve position. This results in blocking the resin supply line.

Figure 13:
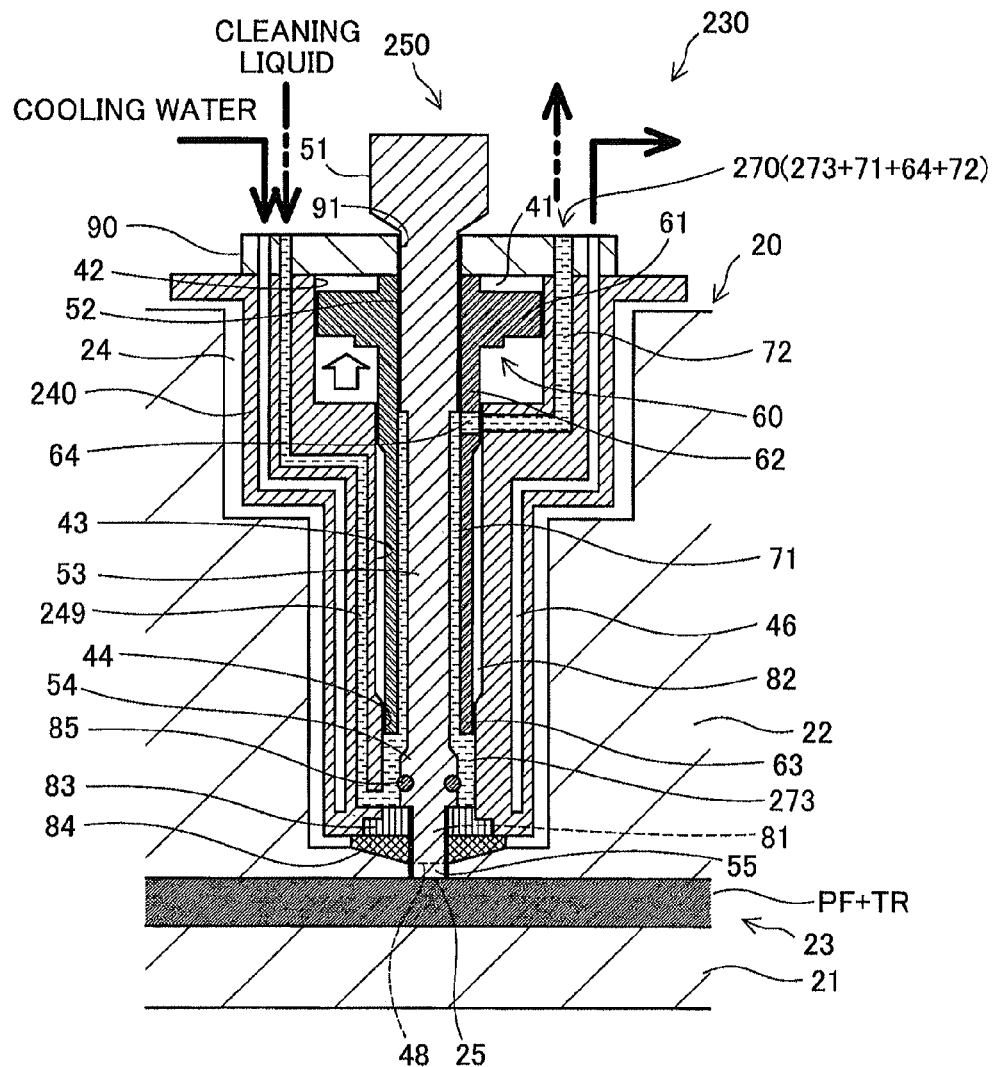
FIG. 13 is a diagram illustrating a state of the gate valve 230 (during cleaning).

FIG. 13 illustrates a state of the gate valve 230 during cleaning. FIG. 13 corresponds to FIG. 7 of the first embodiment. As shown in FIG. 13, compared from the state of FIG. 12, the sleeve 60 is moved from the second sleeve position to the upper first sleeve position, while the gate valve pin 250 is kept at the first pin position. A space 273 is formed along with move of the sleeve 60, and the space 273 communicates with the space 71, the through hole 64 and the partial flow path 72 to form a second fluid flow path 270. In this state, the seal member 85 is exposed on the space 273, like the first embodiment. FIG. 13 illustrates the state that the gate valve 230 is cleaned by using the cleaning line formed by the first fluid flow path 249 and the second fluid flow path 270.

According to the gate valve 230 described above, the second medium diameter section 54 corresponds to the third pin portion of the claims. Part of the first fluid flow path 249 may be provided between the casing 240 and the small diameter section 63 of the sleeve 60.

The configuration of the gate valve 230 suppresses the air from being contained in a resulting molded product and additionally enables the gate valve to be cleaned by using the curing time, like the first embodiment. Additionally, the seal member 85 is exposed on the space 273 that constitutes part of the second fluid flow path 270, so that the sealing position of the seal member 85 can be cleaned. This results in enhancing the durability of the seal member 85 and reducing the frequency of replacement of the seal member 85, thus reducing the workload.

D. Modifications

D-1. Modification 1

In the above embodiments, the second fluid flow path 70, 170 or 270 is formed by using the space formed between the gate valve pin 50 or the gate valve pin 250 and the sleeve 60 or by using the space formed between the sleeve 60 and the casing 40. Alternatively the second fluid flow path may be formed by not using such space. For example, a passage that constitutes a main part of a second fluid flow path (hereinafter referred to as main passage) may be formed in a fixed manner inside of the casing. The main passage may be made to communicate with a space formed by moving the sleeve 60 from the second sleeve position to the first sleeve position (the space 73 or the space 273 in the above embodiments) and thereby form the second fluid flow path. In this case, a hole at an upstream (upstream of the flow of the cleaning liquid) end of the main passage may be formed above the seal member 85 (or the second seal member 186) in relation to the axial direction OD. This configuration enables the seal member 85 (or the second seal member 186) to be cleaned, like the embodiments described above.

D-2. Modification 2

The gate valve pin 50, 150 or 250 and the sleeve 60 are configured to be independently movable along the axial direction OD according to the above embodiments but may alternatively be configured not to be independently movable relative to any position. At least the following configuration is required: the gate valve pin 50, 150 or 250 is movable to the first pin position and the second pin position in the state where the sleeve 60 is at the second sleeve position; and the sleeve 60 is movable to the second sleeve position whether the gate valve pin 50, 150 or 250 is at the first pin position or at the second pin position.

D-3. Modification 3

In the above embodiments, the upstream end of the second fluid flow path 70, 170 or 270 (the space 73 or the space 273 in the above embodiments) is blocked in the state where the sleeve 60 is at the second sleeve position. The middle of the second fluid flow path 70, 170 or 270 may alternatively be blocked. For example, the following configuration may be employed. A convex protruded in a direction crossing the axial direction OD may be provided in the middle of the sleeve 60. A second fluid flow path may start from the lower side of the sleeve 60 shown in FIG. 11 to be formed between the sleeve 60 and the casing 40 along the axial direction OD and is bent in the middle to a direction orthogonal to the axial direction OD. This bending point is opened and closed by the convex of the sleeve 60. This modified configuration also suppresses the air from being contained in a resulting molded product and enables the gate valve to be cleaned by using the curing time.

D-4. Modification 4

In the above embodiments, the gate valve pin 50, 150 or 250 is moved by the actuator, whereas the sleeve 60 is moved by using the stopper 90 and controlling the atmospheric pressure the space 41. Any techniques may be employed for such moving. For example, the outside of the rear end section 51 of the gate valve pin 50 may be covered air-tightly, and the gate valve pin 50 may be moved by controlling the atmospheric pressure in a space where the rear end section 51 is located.

D-5. Modification 5

The second fluid flow path 70, 170 or 270 may have two or more lines. For example, in FIG. 3, the second fluid flow path 70 may have two lines arranged symmetrically on both sides across the gate valve pin 50. This configuration reduces the cross sectional area of each second fluid flow path 70. As a result, this reduces the size of the gate valve 30. Discharging the cleaning liquid from a plurality of locations enhances the effect of discharging the resin as well as the cleaning liquid.

D-6. Modification 6

The material of the molded product manufactured by using the gate valve 30 is not limited to the composite material including the base material and the matrix but may be a single material without the base material. The resin is not limited to the epoxy resin but may be any of various thermosetting resins. Examples of such thermosetting resin include phenolic resins, urea resins, melamine resins and unsaturated polyester resins.

The foregoing describes some embodiments of the invention. The invention is, however, not limited to these embodiments, but a multiplicity of variations and modifications may be made to the embodiments without departing from the scope of the invention. For example, the components of the respective aspects and the components of the embodiments described above may be adequately combined, omitted or conceptualized in a generic manner in any aspect to solve at least part of the objects described above or in any aspect to achieve at least part of the advantageous effects described above.

REFERENCE SIGNS LIST

20 Mold
21 Lower mold
22 Upper mold
23 Cavity
24 Through hole
25 Resin inlet
30, 130, 230 Gate valve
40, 140 Casing
41 Space
42 Large inner diameter section
43 Medium inner diameter section
44 Small inner diameter section
45 Space
46 Cooing flow path
47 Space
47a Gap
48 Resin injection hole
50, 150, 250 Gate valve pin
51 Rear end section
52 First medium diameter section
53 Small diameter section
54 Second medium diameter section
55 Front end section
56 Sloped section
57, 249 First fluid flow path
58 First hole
59 Second hole
60 Sleeve
61 Large diameter section
62 Medium diameter section
63 Small diameter section
64 Through hole
70, 170, 270 Second fluid flow path
71, 73 Spaces
73a Gap
72 Partial flow path
74, 75 Holes
81, 82 Spaces
83 Heat-conducting element
84 Heat-insulating element
85 Seal member
90 Stopper
91 Through hole
152 Middle section 185 First seal member
186 Second seal member
273 Space
OL Axis
PF Base material
TR Resin

The invention claimed is:

1. A gate valve configured to have an injection hole formed therein and switched over to allow or block a flow of a thermosetting resin via the injection hole, the gate valve comprising:
   a casing configured to have a specific space formed inside thereof to be extended along a specified direction;
   a gate valve pin configured to be movable in the specified direction in the specific space; and
   a sleeve provided outside of the gate valve pin in the specific space and configured to be movable in the specified direction, wherein
   the gate valve is configured to have a first fluid flow path,
   wherein in a state where the gate valve pin is at a first pin position, a front end section on an injection hole side of the gate valve pin closes the injection hole to block communication between the first fluid flow path and the injection hole,
   in a state where the gate valve pin is at a second pin position that is more distant from the injection hole than the first pin position, the front end section opens the injection hole to make communication between the first fluid flow path and the injection hole and thereby form a resin supply line for allowing the flow of the thermosetting resin,
   in a state where the sleeve is at a first sleeve position and the gate valve pin is at the first pin position, a second fluid flow path is formed in the gate valve to connect an injection hole-side end of the first fluid flow path to outside of the gate valve and is made to communicate with the first fluid flow path and thereby form a cleaning line for supplying and discharging a cleaning liquid, and
   in a state where the sleeve is at a second sleeve position that is closer to the injection hole than the first sleeve position, the sleeve blocks communication between the first fluid flow path and the second fluid flow path connecting to the outside.

2. The gate valve according to claim 1,
   wherein the first fluid flow path is formed inside of the gate valve pin as a passage to communicate a first hole formed at an end of the first fluid flow path opposite to the injection hole-side end with a second hole formed at the injection hole-side end, and
   the second fluid flow path is formed as a passage to connect the second hole to the outside of the gate valve.

3. The gate valve according to claim 2,
   wherein a second hole-side end of the second fluid flow path is blocked in a state where the sleeve is at the second sleeve position.

4. The gate valve according to claim 3,
   wherein the gate valve pin has a first pin portion with a seal member provided thereon to seal between the gate valve pin and the sleeve, in a state where the gate valve pin is at the first pin position and the sleeve is at the second sleeve position,
   an injection hole-side end surface of the sleeve at the first sleeve position is located on an opposite position of the injection hole across a seal position of the seal member in a state where the gate valve pin is at the first pin position, and
   the second fluid flow path is formed to include a front end-side partial flow path specified as a space by moving the sleeve from the second sleeve position to the first sleeve position in a state where the gate valve pin is at the first pin position.

5. The gate valve according to claim 4,
   wherein the gate valve pin has a second pin portion with a space formed therein as an inner partial flow path between the gate valve pin and an inner surface of the sleeve, the second pin portion being located on an opposite side of the front end section across the first pin portion, and
   the second fluid flow path is formed to include a passage formed by connecting the front end-side partial flow path with the inner partial flow path.

6. The gate valve according to claim 3,
   wherein the sleeve has a sleeve portion with a space formed therein as an outer partial flow path between the sleeve and a specific space-side inner surface of the casing, and
   the second fluid flow path is formed to include a passage formed by connecting the outer partial flow path with a front section-side partial flow path, which is a space specified by moving the sleeve from the second sleeve position to the first sleeve position in a state where the gate valve pin is at the first pin position.

7. The gate valve according to claim 6,
   wherein the gate valve pin has:
      a first seal member provided to seal against the sleeve; and
      a second seal member located closer to the injection hole than the first seal member and provided to seal against the sleeve, wherein
   in a state where the sleeve is at the second sleeve position and the gate valve pin is at the first pin position, the first seal member and the second seal member serve to seal between the gate valve pin and the sleeve, and
   in a state where the sleeve is at the first sleeve position and the gate valve pin is at the first pin position, only the first seal member out of the first and the second seal members serves to seal between the gate valve pin and the sleeve, wherein
   the second fluid flow path is formed to include the front end-side partial flow path.

8. The gate valve according to claim 1,
   wherein the first fluid flow path is formed inside of the casing or between the casing and the sleeve, and
   the gate valve pin has a third pin portion with a seal member provided thereon to seal between the gate valve pin and the sleeve in a state where the gate valve pin is at the first pin position and the sleeve is at the second sleeve position, wherein
   an injection hole-side end surface of the sleeve at the first sleeve position is located on an opposite side of the injection hole across a sealing position of the seal member in a state where the gate valve pin is at the first pin position, and
   the second fluid flow path is formed to include a front end-side partial flow path specified as a space by moving the sleeve from the second sleeve position to the first sleeve position in a state where the gate valve pin is at the first pin position.

9. A manufacturing method of a molded product of a thermosetting resin using the gate valve according to claim 1, the manufacturing method comprising:
   a first step of providing a mold, which has a cavity in a specific shape corresponding to a shape of the molded product and on which the gate valve is mounted;

a second step of sucking the air in the cavity in a state where the gate valve pin is at the first pin position and the sleeve is at the second sleeve position;

a third step of moving the gate valve pin to the second pin position after the second step, to form the resin supply line and inject the thermosetting resin supplied through the first hole into the cavity;

a fourth step of moving the gate valve pin to the first pin position after the third step, to block the resin supply line;

a fifth step of waiting for a predefined time to cure the thermosetting resin injected in the cavity with application of heat; and a sixth step of moving the sleeve to the first sleeve position in the middle of the fifth step, to form the cleaning line so as to supply the cleaning liquid through the first fluid flow path and discharge the cleaning liquid through the second fluid flow path.

10. The manufacturing method of the molded product of the thermosetting resin according to claim 9, wherein the sixth step is performed in the middle of one fifth step out of a plurality of the fifth steps.

* * * * *